United States Patent
Adan et al.

(10) Patent No.: US 7,567,549 B2
(45) Date of Patent: Jul. 28, 2009

(54) COMPUTER TELEPHONY INTEGRATION ADAPTER

(75) Inventors: Manolito E. Adan, Woodinville, WA (US); Michael W. Van Flandern, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 1104 days.

(21) Appl. No.: 10/426,986

(22) Filed: Apr. 30, 2003

(65) Prior Publication Data

US 2004/0218583 A1    Nov. 4, 2004

(51) Int. Cl.
*H04L 12/66* (2006.01)
*H04M 11/00* (2006.01)

(52) U.S. Cl. .................... 370/352; 379/93.05
(58) Field of Classification Search ............ 379/93.05; 370/352
See application file for complete search history.

(56) References Cited

U.S. PATENT DOCUMENTS

| | | | |
|---|---|---|---|
| 4,995,074 A | 2/1991 | Goldman et al. ............... 379/97 |
| 5,574,777 A * | 11/1996 | Lewis ..................... 379/142.12 |
| 5,602,846 A | 2/1997 | Holmquist et al. .......... 370/384 |
| 5,625,678 A * | 4/1997 | Blomfield-Brown ..... 379/93.08 |
| 5,805,587 A | 9/1998 | Norris et al. ................ 370/352 |
| 5,974,043 A | 10/1999 | Solomon .................... 370/352 |
| 6,081,517 A | 6/2000 | Liu et al. .................... 370/352 |
| 6,118,780 A | 9/2000 | Dunn et al. ................. 370/355 |
| 6,215,784 B1 | 4/2001 | Petras et al. ................ 370/356 |
| 6,253,249 B1 | 6/2001 | Belzile ....................... 709/249 |
| 6,292,480 B1 * | 9/2001 | May ........................... 370/352 |
| 6,337,858 B1 | 1/2002 | Petty et al. .................. 370/356 |
| 6,345,047 B1 | 2/2002 | Regnier ..................... 370/352 |
| 6,377,569 B1 | 4/2002 | Tsujigawa et al. .......... 370/352 |
| 6,424,647 B1 | 7/2002 | Ng et al. ..................... 370/352 |
| 6,438,124 B1 | 8/2002 | Wilkes et al. ............... 370/352 |
| 6,621,893 B2 * | 9/2003 | Elzur ....................... 379/93.05 |
| 6,920,130 B2 * | 7/2005 | Ramey ....................... 370/352 |

OTHER PUBLICATIONS

PCI Hotline. "Use a Standard Phone to Make Low Cost Internet Calls!" 2002:1pg. Available: www:net2phone.com.
Net2phone. "PCI Hotline." nd:8pp. Available http://web.net2phone.com/partnerships/distributors/product/dialup/hotline.asp.
Hardware One. "ActionTec Internet Phone Wizard." May 2, 2000: 3pp. Available http://www.hardware-one.com/reviews.asp?aid=163 &page=1.
HomeNetHelp.com. "Internet Phone Wizard from Actiontec." Jul. 10, 2001:3pp. Available http://www.homenethelp.com/web/review/actiontec-phonewizard.asp.

(Continued)

*Primary Examiner*—Rasha S Al Aubaidi

(57) ABSTRACT

A computer telephony interface adapter (CTIA) for interfacing a computing device, a telephone, and a telephone network. The CTIA communicates with the telephone network using a telephone network protocol, such as a PSTN or a PBX protocol. Also, the CTIA communicates with a POTS telephone or a PBX telephone according to the telephone network protocol and with the computing device according to a data communication protocol, such as a USB or wireless protocol. The CTIA includes a controller in communication with the telephone network, the telephone, and the computing device. The controller converts communications between the telephone network protocol and the data communication protocol. In addition, the controller selectively couples the telephone into communication with the telephone network and the computing device at the same time. Thus, the CTIA enables local control over real-time shared communication among the telephone, telephone network, and computing device.

25 Claims, 10 Drawing Sheets

OTHER PUBLICATIONS

Gajeway, Charles H. "Actiontec Call Waiting Modem." Jul. 1, 2001:2pp. Available http://www.smallbusinesscomputing.com/testdrive/article.php/684081.

Harris, Richard. "Actiontec Call Waiting Modem." nd:6pp. Available http://www.hardwarecentral.com/hardwarecentral/reviews/1524/1/.

Actiontec Electronics. "Frequently Asked Questions about Call Waiting Modems." 1999:3pp. Available http://www.callwaitingmodem.com/cw_faq.html.

Rosenzweig, Daniel "Special Report: Call Waiting and Modem FAQ." Aug. 2000:6pp. Available http://www.56k.com/reports/callwait.shtml.

Arar, Yardena. "Internet call waiting turns one phone line into two." Aug. 13, 1999:3pp. Available http://www.cnn.com/TECH/computing/9908/13/callwait.idg/index.html.

Internet Call Manager. "tell me more." 2003:5pp. Available http://www.internetcallmanager.com/TellMeMore/tellmemore.shtml.

TigerJet Network. "USB Internet phone interface—RJ11 to USB." Feb. 20, 2003:2pp. Available http://www.tjnet.com/solutions/usb_phone.htm.

TigerJet Network. "Personal Phone Gateway calls." Nov. 12, 2002:2pp. Available http://www.tjnet.com/softwate/ip_phone/ppg_calls.htm.

TigerJet Network. "IP Phone Center." Nov. 12, 2002. 1 pg. Available http://www.tjnet.com/softwate/ip_phone/index.htm.

Silicon Laboratories, Inc. Si3210 ProSLIC™: "Programmable CMOS SLIC/CODEC with Ringing and Battery Voltage Generation." nd:2pp. Available http://www.silabs.com.

Silicon Laboratories, Inc. "Broadband Access Solutions." nd:2pp. Available http://www.silabs.com.

"NetPhone Services: Short-circuit your telecommuications bill . . . : How Does It Work?" 2000:2pp. Available http://store.yahoo.com/netphone-services/howdoesitwork.html.

"NetPhone Services: Short-circuit your telecommuications bill . . . : Linksys Cable/DSL Router with Net2Phone Jack." 2002:1pg. Available http://store.yahoo.com/netphone-services/lincabroutwi.html.

Linden, Jan and Jan Blom. "Voice Over 802.11 Case Study." Aug. 9, 2002:4pp. Available http://www.globalipsound.com/newsroom/white_papers.php.

Siljerud, Peter and Steven Evans. "Wireless VoIP Ready for Primetime." Jan. 15, 2003:5pp. Available http://www.globalipsound.com/newsroom/white_papers.php.

CommunicationsConvergence.com. "Nortel Recruits GIPS' SoundWare, Unisys Designs Talk2Call. Bear and Diapers—Together Again." nd:1pg. Available http://www.cconvergence.com/article/CTM20020827S0005.

Global IP Sound, Inc. "GIPS VoiceEngine: Simplifying the Design and Implementation of VoIP Soft Clients." Apr. 2002:2pp.

Global IP Sound, Inc. "Speech Coding and Speech Quality in IP Telephony." Oct. 2001:4pp.

Creative Labs: Americas. "VoIP Blaster: Call worldwide with low rates and voice quality superior to other IP telephony solutions." 2002:6pp. Available http://www.americas.creative.com/products/product.asp?Product=203.

Patel, Manish. "Uniden's New Line Up of IP Phones Offer Solutions for PBX Manufacturers and Hosted PBX Carriers." May 5, 2002:2pp. Available mpatel@uniden.com.

"PC-to-PC All Talk Free PC-to-Phone Save Considerable Expenses." 2003:4pp. Available http://www.eznetcomm.com.tw/Eng/EProduct.htm.

Cellsocket. "If You Have a Cell Phone, You Need a Cell Socket." 2002:1pg. Available http://www.cellsocket.com/welcome.html.

* cited by examiner

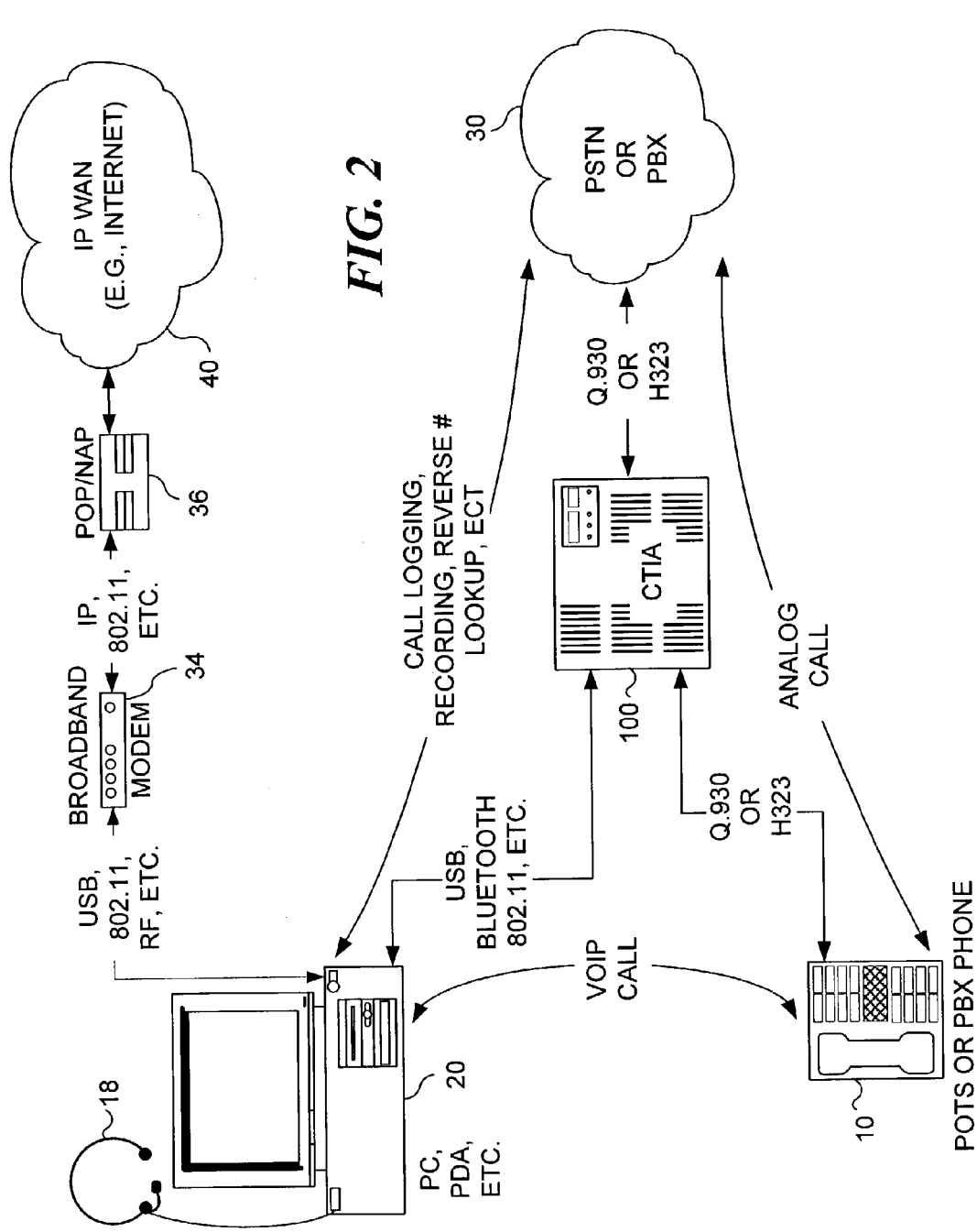

COMPUTER TELEPHONY INTEGRATION ADAPTER

FIELD OF THE INVENTION

The present invention generally relates to integrating data and telephony communication, and more specifically, pertains to selectively enabling local control over real-time shared communication among a telephone, a telephone network, and a computing device.

BACKGROUND OF THE INVENTION

A very large number of homes and offices now have computers and connections to the Internet. Computers have increased personal and professional productivity, enhanced entertainment options, and provided numerous functions that were not feasible in the past. Data communication over the Internet between computer users has also expanded greatly during the last decade. The Internet and other networks that employ the Internet protocol (IP) can also support voice communications by transferring packets of audio data. Voice communication over the Internet is commonly referred to as voice over IP (VOIP). However, IP networks are not optimized for continuous, real-time voice communication. Instead, IP networks are currently optimized to ensure data integrity and minimize data losses. To minimize data losses, IP networks must sometimes resend data packets that were not properly received, which slows the communication. Although these techniques ensure data integrity, the resulting latencies can cause relatively poor quality voice communication that sounds choppy and delayed. In addition, enterprises and home networks often "firewall" products to secure their networks and Network Address Translators (NATs) to increase the number of endpoints that can share an IP address. These products make it difficult to directly address end users across the Internet and they have slowed the adoption of VOIP.

Consequently, most voice communication is still carried out over the conventional public switched telephone network (PSTN). The PSTN was designed to provide reliable, real-time voice communication, at an acceptable cost. To communicate over the PSTN, most consumers use a conventional analog telephone, sometimes referred to as a plain old telephone system (POTS) telephone. Many businesses use analog or digital telephones for communication through a private branch exchange (PBX) to the PSTN. A POTS telephone or a PBX telephone can also be combined with appropriate circuit components that add functionality to provide consumers with data enhanced services related to voice communications, such as caller identification (caller ID) and call waiting.

It would be desirable to integrate the best features of data communication over an IP network and voice communication through the PSTN. Some attempts have been made to bridge the PSTN and IP networks. Current bridge solutions allow data to move between the networks at specific points. Those points are typically central locations that are controlled by large telephone carriers or Internet service providers (ISPs). A few current bridging solutions provide bridge points at a user's desktop, but the bridging is very limited, as discussed in further detail below. In either case, current bridging solutions are more accurately referred to as switching solutions, not true integration solutions that share communication among standard telephones, the PSTN, digital computing devices, and/or IP networks.

FIGS. 1A-1C illustrate some of the prior art piecemeal approaches that have attempted to bridge communication between computer networks and telephone networks. FIG. 1A may be interpreted in two possible ways; the Figure may represent a configuration in which a conventional telephone 10, such as a POTS telephone, and a computing device, (e.g., a PC 20) share a single subscriber line 12 that is connected to a PSTN 30. A POTS telephone 10 and PC 20 typically share subscriber line 12 through a conventional modem 14, such as a 56 kilobyte modem. When interpreted in this manner, subscriber line 12 is limited to a single function at a time—either voice communication or data communication. Conventional voice communication would include PSTN audio signals, and signaling data for call control, such as on/off hook detection, dual tone multi-frequency (DTMF) encoding/decoding, and ring detection. Conventional voice communication may also include other signaling data, such as frequency shift keying (FSK) data for caller ID, that can be used by POTS telephone 10 or an auxiliary FSK device 16. However, the signaling data in this prior art configuration cannot be used by PC 20, because PC 20 does not directly recognize communications that conform to PSTN protocols and data communications cannot be multiplexed through conventional modem 14. PC 20 may only access subscriber line 12 via conventional modem 14 when POTS telephone 10 is not in use. Computer data communication from PC 20 is routed through PSTN 30 to a media gateway 32. Media gateway 32 is typically a point of presence (POP) device at an ISP that transfers data signals to an IP wide area network (WAN) 40, such as the Internet. While connected to IP WAN 40, a user can make VOIP calls through PC 20 with a headset 18, or using a conventional microphone and speakers (neither shown) that are attached to PC 20. However, the user cannot switch to a PSTN voice call without losing the Internet connection, which is especially inconvenient to users who have paid for a conventional PSTN call waiting function.

Two approaches have been taken to solve the call waiting problem. One is an Internet call waiting service, which displays a notice of an incoming call on a user's PC while the user's PC is connected to the Internet. When the user's PC is connected to the Internet, special software on the user's PC informs a call management service that the user is online. The user must also have a conventional PSTN call forwarding service. When the user is online, any incoming PSTN calls are automatically routed to the provider of the call management service. The call management service provider detects the forwarded PSTN call, and sends an IP message to the user's computer, informing the user of the incoming PSTN call. The user may then choose to ignore the incoming PSTN call or accept the incoming PSTN call, thereby terminating the Internet connection. An example of Internet call waiting service is INTERNET CALL MANAGER™, which is provided by InfoInteractive Corp. However, Internet call waiting is only useful while the user is online, and does not replace conventional PSTN call waiting when the user is not online.

An alternative approach includes a call waiting modem, such as that distributed by ActionTec Electronics, Inc. While the user is online, a call waiting modem can detect an incoming signal from a user's conventional PSTN call waiting service. Typically, the modem will notify the user of a waiting call with a light or sound emanating from the call waiting modem. The user may then answer the waiting call with a conventional POTS telephone and talk for a limited amount of time (e.g., seven seconds) without losing the Internet connection. If the user ends the call within the limited amount of time, the user may continue using the Internet connection. If the user does not end the call within the limited amount of time, the call waiting modem automatically terminates the Internet connection.

FIG. 1A may alternatively represent a configuration comprising a digital subscriber line (DSL) modem. The media gateway may comprise a central office (CO) that lets voice signals continue on the PSTN, and switches data signals onto the IP WAN. The CO typically includes a switch or splitter that separates PSTN voice signals from IP data signals, and a DSL Access Multiplexer (DSLAM) that multiplexes data signals from multiple client devices onto a single connection to the IP WAN. With DSL service, a user can make voice calls over the PSTN with a conventional POTS telephone while maintaining a continuous connection with the Internet at the same time. With these two separate lines of communication, the user can hold a VOIP conversation over the Internet through the user's PC, and also hold a conventional voice call over the PSTN through the user's POTS telephone. However, the user has no control over bridging between the PSTN and the IP WAN that occurs in the CO. Thus, the PSTN and IP WAN are still effectively separate at the user's desktop. The user cannot conference a PSTN voice call with a VOIP call. Also, the user cannot benefit from PSTN added functions, such as caller ID and call waiting, through the user's PC.

Under this latter interpretation of FIG. 1A, other desktop bridging attempts have been made, but are typically limited to selectively switching between IP and PSTN networks. For example, a device called INTERNETPHONEWIZARD™, which is also distributed by ActionTec Electronics, Inc., enables a user to switch between a PSTN voice call and a VOIP call with a single conventional POTS telephone. The user connects the POTS telephone to the INTERNETPHONEWIZARD, as well as a PSTN line. The user then connects the INTERNETPHONEWIZARD to a PC via a universal serial bus (USB) port or by coupling with a peripheral component interconnect (PCI) bus in the PC. The user can make a VOIP call from the POTS telephone through the PC using a broadband connection with the Internet, such as through the DSL modem. If desired, the user can switch to a PSTN voice call without losing the internet connection. However, the PSTN call and the VOIP call cannot be conferenced together for a three-way call with the POTS phone. Also, added PSTN functions, such as caller ID, cannot be accessed by the PC.

FIG. 1B represents another typical configuration whereby the PSTN and IP WAN remain separate. This is often the case in offices. The conventional POTS or PBX phones are connected to the PSTN in a conventional manner. The PC is connected to a local area network (LAN) 35, for communication with other local PCs and/or peripheral devices. LAN 35 is connected to IP WAN 40 through a POP device and/or a Network Access Point (NAP) 36, which are often controlled by an ISP. Thus, VOIP calls and other IP communications are kept entirely separate from the PSTN.

FIG. 1B may also represent a configuration comprising broadband modem access to the Internet through an ISP. If a broadband modem 34, such as a cable modem or a DSL modem, is under the user's control, the INTERNETPHONEWIZARD may be used to switch the POTS telephone between the PSTN and the Internet thought the PC, as described above. However, the same limitations apply to this configuration. Namely, a PSTN call and the VOIP call cannot be conferenced together for a three-way call with the POTS phone, and added PSTN functions cannot be accessed by the user's PC.

FIG. 1C represents a configuration wherein the PSTN is eliminated, and the POTS telephone is replaced with an IP telephone 21 that uses IP communication instead of analog PSTN communication. All calls are VOIP calls and are typically routed through an Internet telephony service provider (ITSP) that specializes in VOIP services. This configuration may also include wireless communication to a personal data assistant (PDA) telephone 23, so that the PDA telephone can be used for VOIP calls. However, as indicated above, VOIP calls are often not as clear and reliable as conventional PSTN calls. Because IP communication was not designed for continuous, real-time voice communication, it allows for processing latencies, transmission latencies, dropped data packets, retransmitted data packets, and has other characteristics that help to ensure data integrity. However, as indicated above, these characteristics of IP communication often make VOIP calls sound choppy and delayed.

Some attempts have been made to reduce delays, dropped packets, and other problems for VOIP calls. For example, Global IP Sound, Inc. has developed software that can run on PCs, PDAs, and other local computing devices and interpolates voice data in place of dropped data packets, reduces local processing delays, reduces echo, and provides other improvements. Nevertheless, the PSTN still generally provides higher quality voice communication in a more cost effective manner for most users, especially home users, than VOIP communication. Thus, it is desirable to retain use of the PSTN for clear, inexpensive voice calls, but it is also desirable to utilize PC processing power and IP communication.

There is thus a clear motivation to integrate computing devices, telephones, and telephone networks locally, e.g., at a client desktop. In general, local integration should include signaling data (sometimes referred to as "call control data") and audio data (sometimes referred to as "voice transport"), along with digital computing data. For example, audio integration should enable a user to conference a PSTN call and a VOIP call together. Integration of signaling data at the client desktop should enable a user to employ both PSTN call control data and IP WAN data in the user's PC to log both PSTN and VOIP calls on the user's PC, control incoming PSTN calls with the PC, use a POTS telephone to control other networked devices, and implement a host of other applications and functions.

SUMMARY OF THE INVENTION

The present invention comprises a computer telephony interface adapter (CTIA) for interfacing a computing device, a telephone, and a telephone network. The CTIA includes a telephone network interface for communicating with the telephone network according to a telephone network protocol, such as PSTN or PBX protocols. Similarly, the CTIA includes a telephone interface for communicating with a telephone, such as a POTS telephone or a PBX telephone. The CTIA also includes a computer interface for communicating with the computing device according to a data communication protocol, such as USB or one of the wireless protocols. The CTIA further includes a controller in communication with the telephone network interface, with the telephone interface, and with the computer interface. The controller converts communication data formats between the telephone network protocol and the data communication protocol, as required. In addition, the controller includes a switch that selectively couples the telephone in communication with the telephone network and the computing device at the same time. Once switched to a common connection, the CTIA selectively enables real-time shared communication of audio and data among the telephone, the telephone network, and the computing device, at the same time.

In further detail, the controller of the CTIA includes a coder/decoder (CODEC) for converting between digital signals and analog telephone network signals. For analog communication, the CODEC includes a subscriber line interface circuit (SLIC) that enables the conversion. The CODEC may comprise different components for converting audio signals and signaling data. The CODEC or other part of the CTIA also includes a power source that is used to power the telephone when the telephone is not coupled to the telephone network, for example, when the telephone is coupled only to the computing device for use in making a VOIP call. Alternatively, or additionally, the controller of the CTIA may include a multiplexer for multiplexing data communication with a PBX telephone network.

The CTIA may further include a hook switch that is coupled to the controller, the telephone network interface, and a hold circuit. The hook switch enables communication along a path between the computing device and the telephone network to be placed on hold. The CTIA may further include a transformer to provide electrical isolation between the controller and the telephone network interface, while enabling communication. Other protection functions and additional features may also be included. For example, the CTIA may include a frequency shift keying (FSK) decoder. The FSK decoder decodes FSK data, such as caller ID data, from signals received from the telephone network. The FSK decoder can then provide the FSK data to the controller, which may in turn communicate the FSK data to the computing device for reverse number lookups, call filtering, or other functions. The FSK decoder may be implemented as a hardware or software module. The software module detects bit values as a function of time between a high to low transition of FSK signals.

The CTIA may also include an off hook detector between the switch and the controller. The off hook detector detects an off hook state of the telephone and notifies the controller. A ring detector is included in the CTIA and is disposed between the telephone network interface and the controller. The ring detector detects a ring signal from the telephone network and notifies the controller.

The computing device is preferably in communication with a LAN or WAN to enable VOIP calls. However, the CTIA itself may include a data network interface and/or be incorporated into a data network device for communicating over the data network with a remote computing device. Similarly, the CTIA may include wired or cordless interfaces to the telephone, or be incorporated in a telephone.

Another aspect of the invention is directed to a method and system for selectively coupling signaling data and audio signals among a telephone, a telephone network, and a computing device. The method and system provide for joining communication paths together so that the signaling data and the audio signals are shared among the telephone, the telephone network, and the computing device. A telephone-to-telephone network (T-TN) communication path conveys data and signals between the telephone and the telephone network. The T-TN communication path enables communication of the signaling data and audio signals according to telephone network protocols. A telephone-to-computer (T-C) communication path extends between the telephone and the computing device and includes a converter that converts the signaling data and audio signals between the telephone network protocols and data communication protocols used by the computing device. The T-TN communication path and the T-C communication path are coupled together to establish communication between the T-TN communication path and the T-C communication path so that the signaling data and the audio signals on the T-TN path can be processed by the converter. Coupling the paths and converting between communication protocols enables sharing of the signaling data and the audio signals among the telephone, the computing device, and the telephone network.

A further aspect of the invention is directed to a method and system for causing the computing device to control communication of the signaling data and audio signals among the telephone, the telephone network, and the computing device. The computing device communicates an off hook instruction to the CTIA according to the data communication protocol, causing the CTIA to initiate communication with the telephone network according to a telephone network protocol. The computing device places a telephone call by communicating a telephone number to the CTIA using the data communication protocol, causing the CTIA to convert the telephone number into a sequence of DTMF signals that are communicated to the telephone network according to the telephone network protocol. For a digital PBX system, the telephone number can simply be passed to the telephone network as digital data according to the PBX protocol. The computing device receives signaling data and audio signals for the telephone call from the CTIA, but the signaling data and audio signals are converted to conform to the data communication protocol used by the computing device. The computing device may then communicate a switch instruction to the CTIA, causing the CTIA to connect a shared communication path among the telephone, the telephone network, and the computing device. The signaling data and audio signals can then be shared by each device at the same time.

Yet another aspect of the invention is directed to a memory medium on which machine instructions are stored for carrying out the steps of any method discussed above, as described in further detail below.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 2 is a functional block diagram illustrating an exemplary architecture for sharing communication among a computing device, a conventional telephone, and a conventional telephone network;

Figure 9:
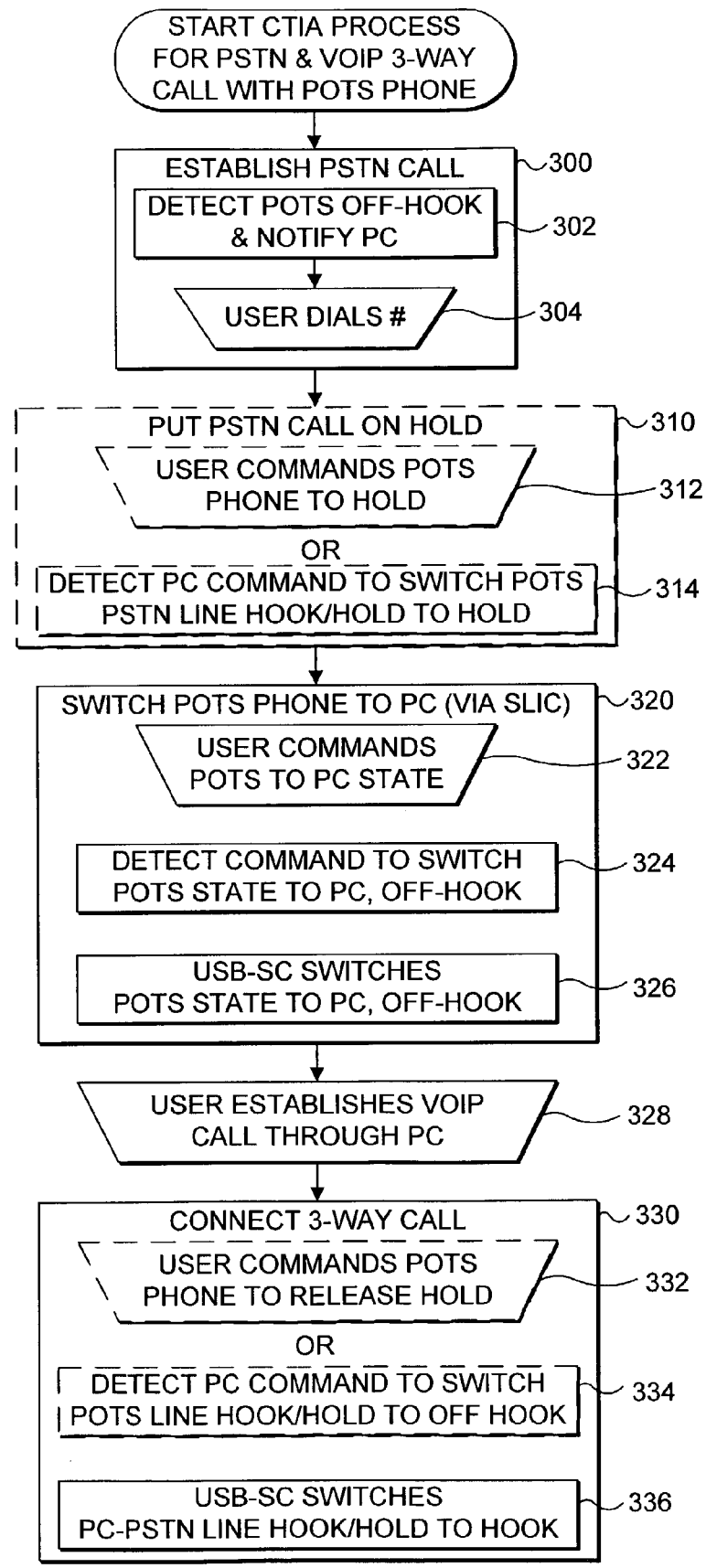
Figure 10:
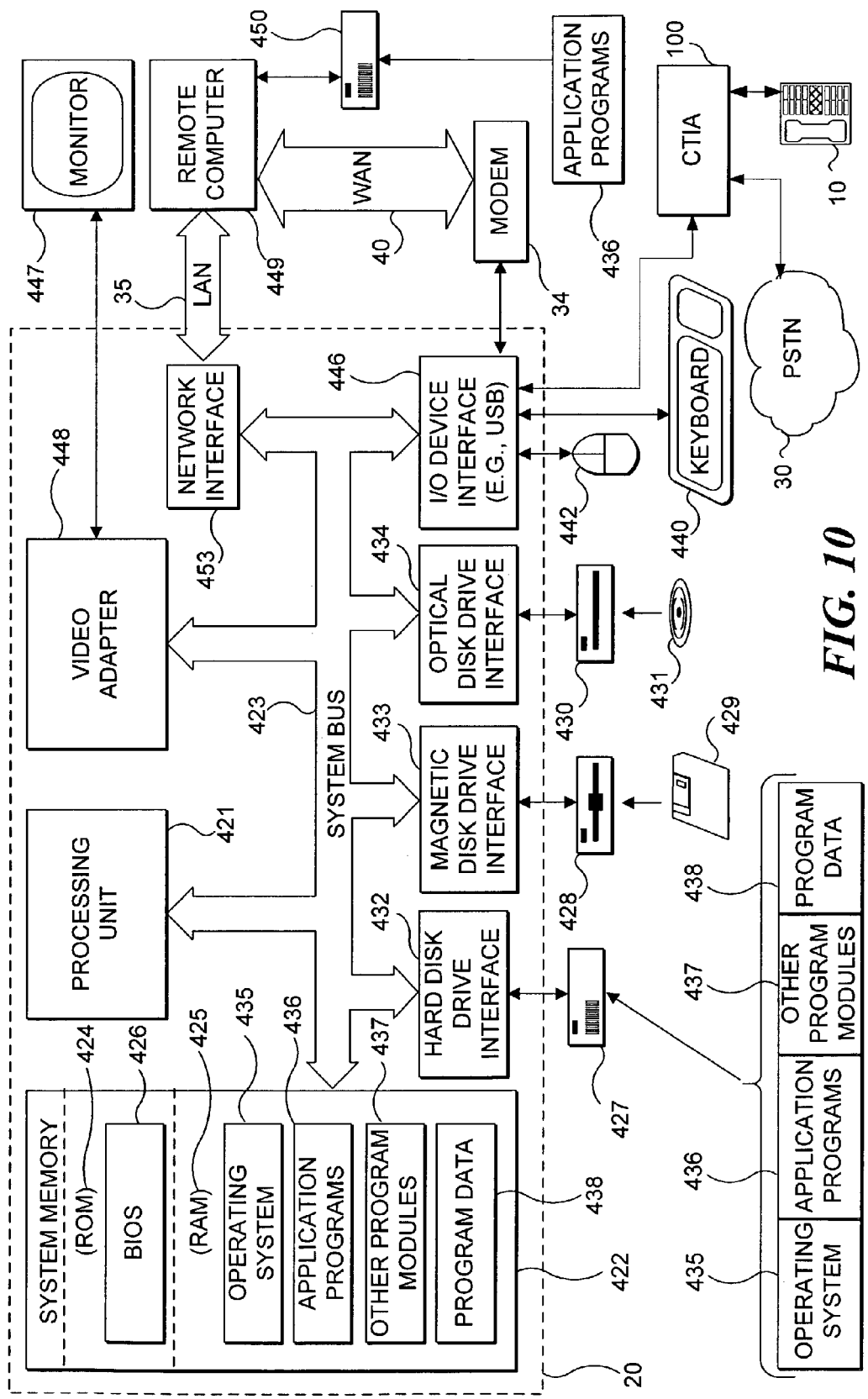

FIG. 9 is a flow diagram illustrating logic to establish a three-way call, wherein one call is established over the PSTN between the user's local POTS telephone and a second party through another POTS telephone, and another call is established over the IP network between the user and a third party; and FIG. 10 is a functional block diagram illustrating a suitable computing device for use in implementing the present invention.

DESCRIPTION OF THE PREFERRED EMBODIMENT

Exemplary Architecture

The architecture described below illustrates a preferred embodiment of the present invention. FIG. 2 is a functional block diagram illustrating an exemplary architecture for combining audio and data communications among a conventional telephone 10, a PC 20 (or other computing device), and a conventional telephone network 30, using a CTIA 100. In one application of this three-way coupling through CTIA 100, a user may place a conventional telephone call with a conventional POTS or PBX telephone 10 through a conventional PSTN or PBX telephone network 30. Telephone 10 communicates with CTIA 100 via a conventional telephone protocol, such as Q.930 or H323. Conventional telephone signals such as audio signals and call control signaling data may pass from telephone 10 directly through CTIA 100 to telephone network 30 via the same conventional telephone protocols. Conversely, conventional telephone signals may pass from telephone network 30 through CTIA 100 back to telephone 10.

In addition, CTIA 100 can convert conventional telephone signals into data signals that conform to conventional data communication protocols, and vice versa. For example, CTIA 100 can convert conventional telephone signals into data signals that conform to USB, Bluetooth™, 802.11, Ethernet™, or other data communication protocols. The converted signals are communicated to PC 20, enabling call logging, call recording, reverse number lookups, and numerous other functions. Conversely, CTIA 100 may convert conventional data signals to PSTN, PBX, or other conventional telephone signals. This bidirectional conversion capability enables a user to participate in a conventional telephone call using headset 18 through PC 20, and to participate in a VOIP call with conventional telephone 10. Headset 18 enables voice communication through PC 20. PC 20 is preferably in communication with a broadband modem 34, which communicates through a POP/NAP 36 to IP WAN 40, such as the Internet. Thus, IP data comprising a VOIP call from IP WAN 40 can be converted into conventional telephone signals for use by telephone 10.

Accordingly, CTIA 100 enables local integration of both audio communications and data communications between traditionally separate telephone and data networks. Moreover, CTIA 100 enables local user control over concurrent communication through both the telephone network and the data network. For instance, a user can locally participate in a three-way call between a VOIP caller and a conventional telephone network caller at the same time. CTIA 100 also enables sharing of data from both networks on either telephone 10 or PC 20. For example, CTIA 100 can decode caller ID data from telephone network 30 and provide the decoded data to PC 20. Conversely, CTIA 100 can provide data, such as DTMF signals, from PC 20 to telephone 10. Further capabilities and functionality of the present invention are described in detail below.

Exemplary System

Figure 1C:
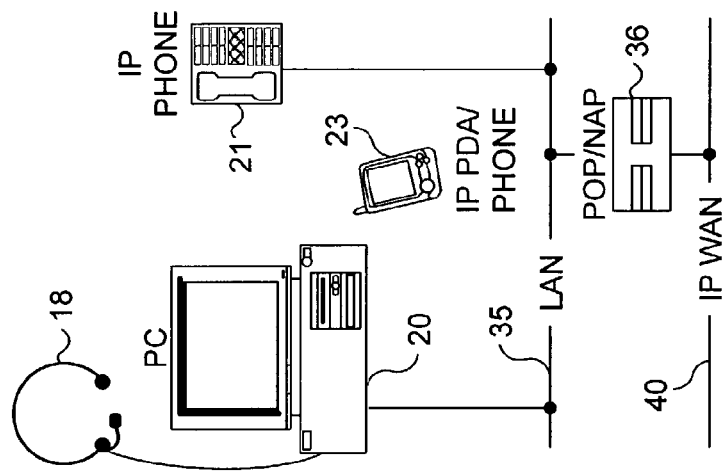
FIG. 1C (Prior Art) is a functional block diagram illustrating a configuration wherein all communication is performed over data networks (and not over the PSTN)
Figure 1B:
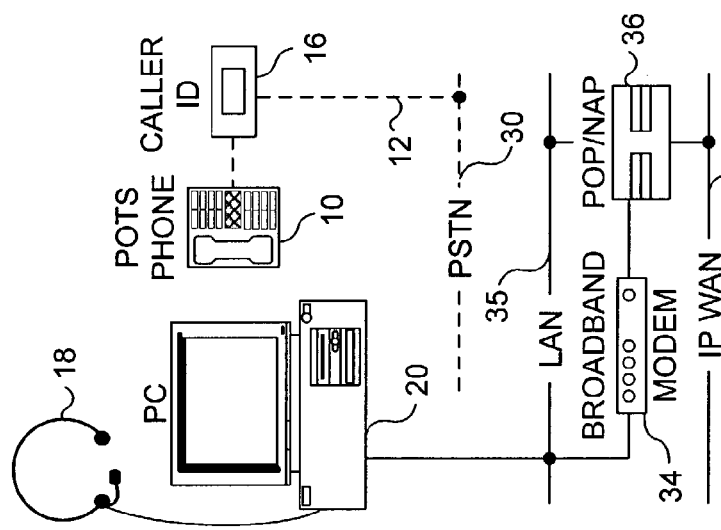
FIG. 1B (Prior Art) is a functional block diagram illustrating a configuration wherein the PSTN and IP WAN remain in separate use.
Figure 1A:
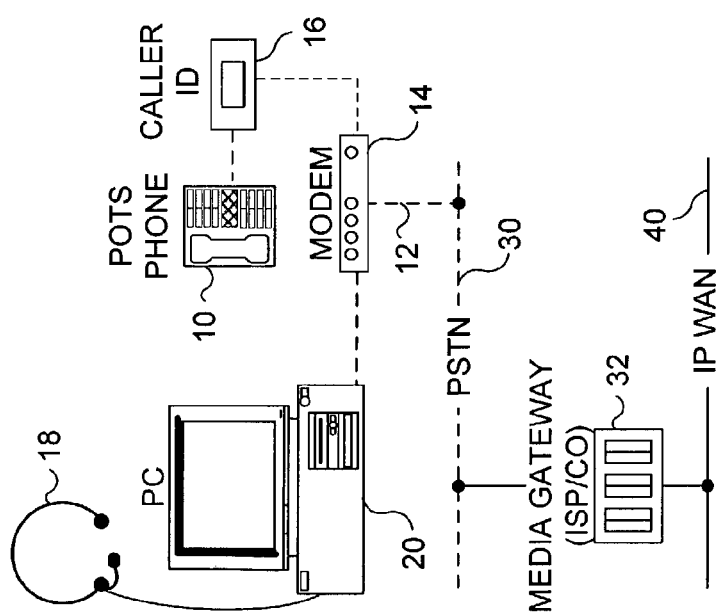
FIG. 1A (Prior Art) is a functional block diagram illustrating a configuration in which a conventional telephone and a computing device share a single subscriber line to a PSTN.
Figure 3:
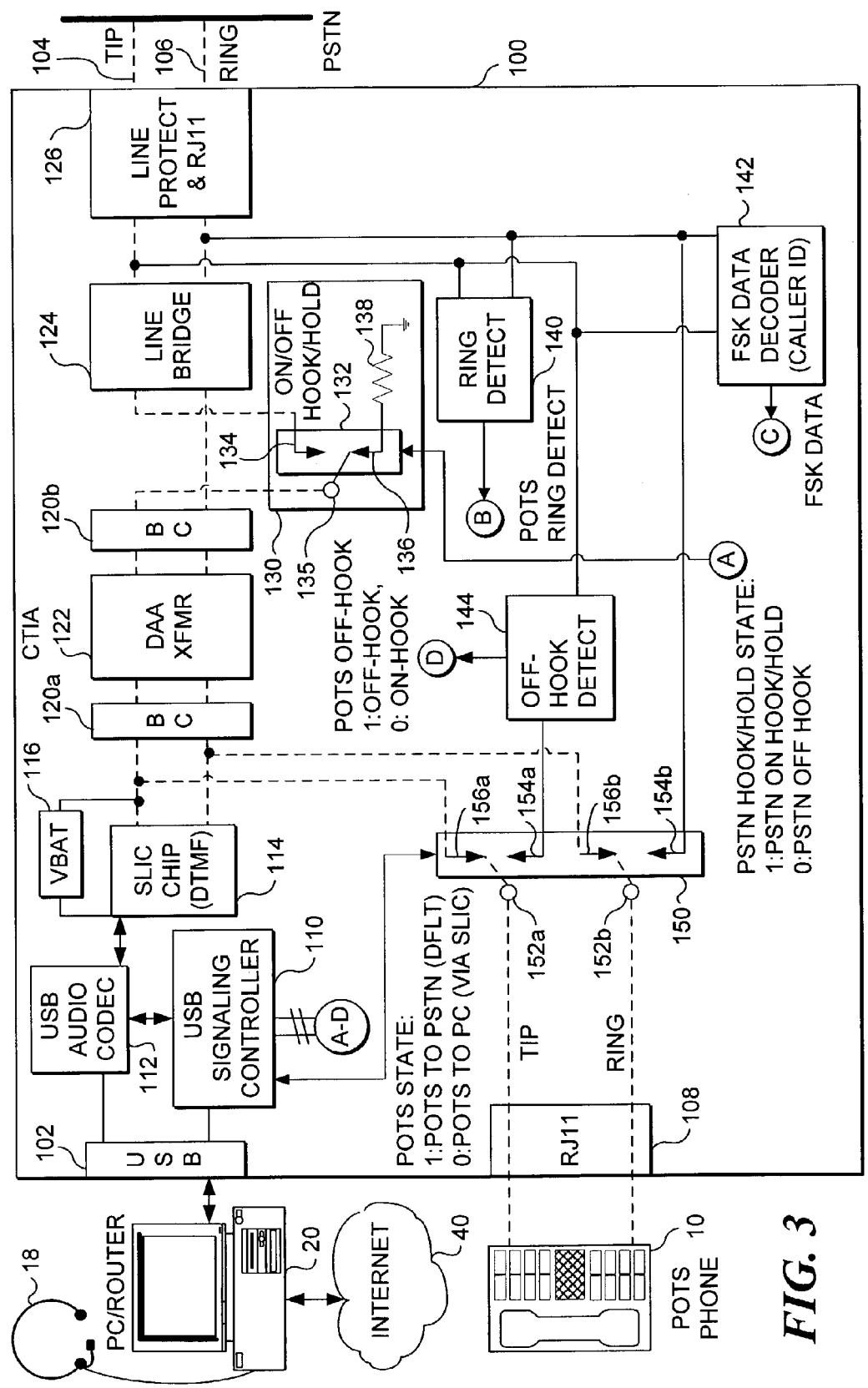
FIG. 3 is a functional block diagram of a CTIA.

FIG. 3 is a functional block diagram of CTIA 100. CTIA 100 includes a USB port 102 for communicating with a computing device such as PC 20. Those skilled in the art will recognize that numerous alternate or additional ports on CTIA 100 may be used, such as a serial port, a parallel port, an Ethernet port, a wireless interface (e.g., radio frequency, infrared, Bluetooth™, etc.), a peripheral component interconnect (PCI) connection, etc., and that USB port 102 may be used to communicate with numerous other types of computing devices, such as a network router, a network access device, a PDA, etc. In any case, the computing device and/or CTIA 100 is preferably in communication with IP WAN 40 to enable access to other local or remote computing devices over an IP network.

USB port 102 is in communication with a USB signaling controller 110, such as a CY7C63413 USB microcontroller from Cypress Semiconductor Corporation. USB signaling controller 110 provides primary control over communication with the computing device and is also preferably programmed to provide control over other internal components of CTIA 100, as discussed in further detail below. In communication with USB signaling controller 110 is a USB audio CODEC 112, such as a Tiger 560™ CODEC from TigerJet Network, Inc. USB audio CODEC 112 encodes and decodes audio data that are communicated via the USB protocol to and from the computing device. Preferably, USB audio CODEC 112 conforms to industry standard USB audio specifications to enable communication with industry standard audio drivers on the computing device.

USB audio CODEC 112 is also in communication with a SLIC chip 114, such as a Si3210 from Silicon Laboratories, Inc. SLIC chip 114 provides an analog telephone line interface for converting between analog telephone signals and digital audio data. Preferably, SLIC chip 114 also includes other capabilities, such as DTMF generation and decoding, ring signal generation, and DC to DC power conversion. As part of the power conversion, or separately, a battery 116 is provided along with SLIC chip 114. Battery 116 provides power at a voltage and current level conforming to conventional analog telephone protocols. Providing a conventional analog telephone power source within CTIA 100 enables conventional telephone 10 to communicate with the computing device when power is not provided by the telephone network. For example, the conventional telephone may be switched to communicate with the computing device, enabling a VOIP call to be placed over the Internet using the conventional telephone. In that case, power is not available from a conventional analog telephone network to supply the telephone and must instead be supplied from within CTIA 100.

SLIC chip 114 is in communication with a standard tip line 104 and a standard ring line 106 through several protection components. More specifically, SLIC chip 114 is in communication with a balance circuit 120a, which provides conventional voltage and current balancing for analog telephone signals. Balance circuit 120a is in communication with a digital access arrangement (DAA) 122, which preferably includes a multi-winding transformer that electrically isolates analog telephone signals between balance circuit 120a and a second balance circuit 120b. Second balance circuit 120b is in communication with a line bridge 124 that includes rectifiers to insure correct polarity of the signals supplied for analog telephone communication. Line bridge 124 is coupled with a line protect circuit 126 that includes a fuse and/or other circuitry to protect CTIA 100 from power surges or other potentially harmful signal irregularities from the telephone network. Preferably, line protect circuit 126 is coupled with a standard RJ11 connector for connecting CTIA 100 to PSTN 30.

To control communication between the computing device and PSTN 30, an on/off hook/hold circuit 130 is inserted between second balance circuit 120b and line bridge 124. On/off hook/hold circuit 130 includes a switch 132 that breaks or completes communication over at least one of tip line 104 and ring line 106. Preferably, tip line 104 from line bridge 124 is connected to a first terminal 134 of switch 132. When switch 132 is in contact with first terminal 134, tip line communication is completed through a common terminal 135 that is connected to second balance circuit 120b. However, if switch 132 is switched to a second terminal 136, the tip line connection is broken, and second balance circuit 120b may then be connected to a hold resistor 138. Hold resistor 138 has a resistance selected to enable an analog call to be placed on hold in a conventional manner. On/off hook/hold circuit 130 is controlled by USB signaling controller 110 via a connector A, which receives commands from the computing device. Thus, when the user is engaged in an analog telephone call through the PSTN, the computing device can command CTIA 100 to place the analog telephone call on hold for as long as desired. Other conditions within CTIA 100 may also cause USB signaling controller 110 to control on/off hook/hold circuit 130. For instance, a user may press predefined key(s) on telephone 10 to supply an instruction to USB signaling controller 110 that causes it to command on/off hook/hold circuit 130 to change state.

USB signaling controller 11 may also evaluate and relay analog telephone signaling data. For example, USB signaling controller 110 may receive telephone ring data from a ring detect circuit 140 via a connector B. Ring detect circuit 140 is in communication with tip line 104 and ring line 106 between line bridge 124 and line protect circuit 126. If ring detect circuit 140 detects a ring signal from PSTN 30, ring detect circuit 140 notifies USB signaling controller 110. USB signaling controller 110 may in turn notify the computing device, which can then display a message to the user indicating that an incoming analog telephone call has been detected. Alternatively, or in addition, USB signaling controller 110 can perform a function that is internal to CTIA 100, such as activating a "do-not-disturb" function that automatically puts CTIA 100 in an off hook state, to immediately answer the call and route the call to PC 20 for recording a message in a voice message recording mode, without allowing telephone 10 to ring.

Similarly, a FSK data decoder 142 can provide FSK data to USB signaling controller 110. FSK data decoder 142 is also connected to tip line 104 and ring line 106, between line bridge 124 and line protect circuit 126. FSK data are encoded and typically provided from the PSTN between a first ring signal and a second ring signal. FSK data decoder 142 detects and decodes caller ID data and any other FSK data, and provides the decoded FSK data to USB signaling controller 11 via a connector C. FSK data decoder 142 may comprise a dedicated FSK chip, such as an MT88E39 from Zarlink Semiconductor, Inc. Alternatively, FSK data decoder 142 may be implemented as an FSK firmware module that detects bit values as a function of time between a high to low transition of FSK signals. Specifically, when the FSK firmware module detects a FSK signal (e.g., a 1 bit on a line of the microcontroller designated for caller ID data), the FSK firmware module starts a timer. The timer is loaded with a timeout period of about 833 microseconds. When a high to low transition occurs, the FSK firmware module reads the time value. If the time value is greater than zero (i.e., the timeout period did not elapse), the FSK signal must have been a short pulse. A short pulse is indicative of a 2200 Hz FSK signal, which represents a 0 bit. Conversely, if the time value is less than or equal to zero (i.e., the entire timeout period elapsed), the FSK signal must have been a long pulse. A long pulse is indicative of an 1100 Hz FSK signal, which represents a 1 bit. The FSK firmware module assembles the bits into bytes that conform to caller ID specifications.

USB signaling controller 110 in turn conveys the FSK data to the computing device. The computing device can use the FSK data in a manner similar to that of a conventional caller ID module. For example, the computing device may determine a caller's telephone number from the FSK data, associate the caller's telephone number with a name stored in a database, and display the name and/or the caller's telephone number to a user. However, the computing device can also perform a number of other functions, which would unduly increase the complexity and cost of a conventional caller ID module, or are not possible with a conventional caller ID module. For instance, the computing device can provide an automated message, log the incoming call, block the incoming call, record the incoming call, forward the incoming call to an Internet address to establish a VOIP call, forward the incoming call to another computing device such as a server, or perform numerous other functions in response to the caller ID data.

When a handset of telephone 10 is lifted, an off hook detect circuit 144 detects the off hook state of the telephone handset and notifies USB signaling controller 110 via a connector D. Off hook detect circuit 144 is preferably in communication with tip line 104 between line bridge 124 and line protect circuit 126. Providing an off hook indicator to USB signaling controller 110 enables the computing device to know the state of telephone 10. The computing device may then notify a VOIP caller that the user is already engaged in an analog telephone call, notify the user of a waiting VOIP call (i.e., perform a VOIP call waiting function when the user is already making a PSTN/PBX call), or perform other functions.

Tip line 104 from off hook detect circuit 144 and ring line 106 from between line bridge 124 and line protect circuit 126 are connected to a telephone state switch 150. Telephone state switch 150 has a common terminal 152a that is coupled to an RJ11 connector 108, providing a tip line to telephone 10, and a common terminal 152b that is coupled to RJ11 connector 108, providing a ring signal line to the telephone. In general, telephone state switch 150 switches communication with the telephone between the conventional telephone network (e.g., PSTN 30) and the computing device (e.g., PC 20). USB signaling controller 110 is also in communication with telephone state switch 150 to provide a switching control signal and may also detect the state of telephone state switch 150. When the telephone state switch 150 is switched to communicate with PSTN 30, common terminals 152a and 152b are connected to telephone line terminals 154a and 154b, respectively. This condition is preferably the default state of telephone state switch 150. Conversely, when telephone state switch 150 is switched to communicate with PC 20, common terminals 152a and 152b are connected to computer line terminals 156a and 156b, respectively. Computer line terminal 156a is connected to SLIC chip 114 and balance circuit 120a, to communicate along the tip line. Similarly, computer line terminal 156b is connected to SLIC chip 114 and balance circuit 120a, to communicate along the ring line. However, because computer line terminals 156a and 156b are connected to both SLIC chip 114 and balance circuit 120a, the telephone can be used to communicate with the telephone network and the computing device at the same time. Thus, the telephone can be used to engage in an analog telephone call over the PSTN, conferenced to a VOIP call over the IP network at the same time. Further, the computing device can also be used to engage in a conferenced analog telephone call and a VOIP call at the same time.

CTIA 100 will switch to the default condition if the VOIP call fails, or other interruption occurs to the communication with the computing device. For example, if the IP network communication quality degrades beyond predefined threshold, the IP network connection fails, the computing device crashes, or other interruption occurs, USB signaling controller 110 will detect the interruption and cause telephone state switch 150 to connect common terminals 152a and 152b to telephone line terminals 154a and 154b, respectively. If the telephone handset is off hook, the PSTN will provide a conventional dial tone, which indicates to the user that communication with the computing device is unavailable. A converse failure management function can be performed if an analog call through the telephone network fails while the user is communicating through the computing device In that case, the user will hear a VOIP dial tone or other indication that the telephone network lost communication.

In addition to voice communications, the telephone may be used to issue commands to the computing device, an entertainment device, an appliance, or other devices. Commands may be issued through a telephone keypad as DTMF tones, which are decoded by SLIC chip 114 and communicated to USB signaling controller 110. USB signaling controller 110 can relay those commands to the computing device, which can perform a desired computing function and/or control another device that is in wireless or wired communication with the computing device. For example, the telephone keypad may be used to relay commands through the computing device to a networked entertainment system or other appliance. Similarly, the telephone keypad may be used to issue commands that are relayed through a wireless communication interface (not shown), directly to the entertainment system or appliance, instead of going through USB signaling controller 110. A remote telephone keypad can also be used to issue commands. For example, CTIA 100 can be programmed to detect a ring signal, answer the incoming PSTN call, and enable communication between the PSTN and the computing device. The remote caller can enter DTMF tones via the remote telephone keypad, which are decoded by SLIC chip 114 and passed to USB signaling controller 110. Through predefined DTMF tones, the remote caller can issue commands to that are relayed to the computing device, entertainment system, appliance, or other device that is in communication with CTIA 100.

Alternatively, or additionally, USB signaling controller 110 can use telephone keypad commands to perform other functions internal to CTIA 100. For example, a predefined set of DTMF tone(s) entered via the telephone keypad may cause USB signaling controller 110 to switch telephone state switch 150 between the telephone line terminals and the computer line terminals. A different set of predefined DTMF tone(s) entered via the telephone key pad may cause USB signaling controller 110 to place on/off hook/hold circuit 130 in a hold state. Those skilled in the art will recognize that numerous other functions may be performed by entering DTMF tones via the telephone keypad. Those skilled in the art will also recognize that CTIA 100 may include a number of other conventional components, such a memory, a power source, a bus, a speaker, signal quality control circuitry, etc.

Additional Embodiments

Figure 4B:
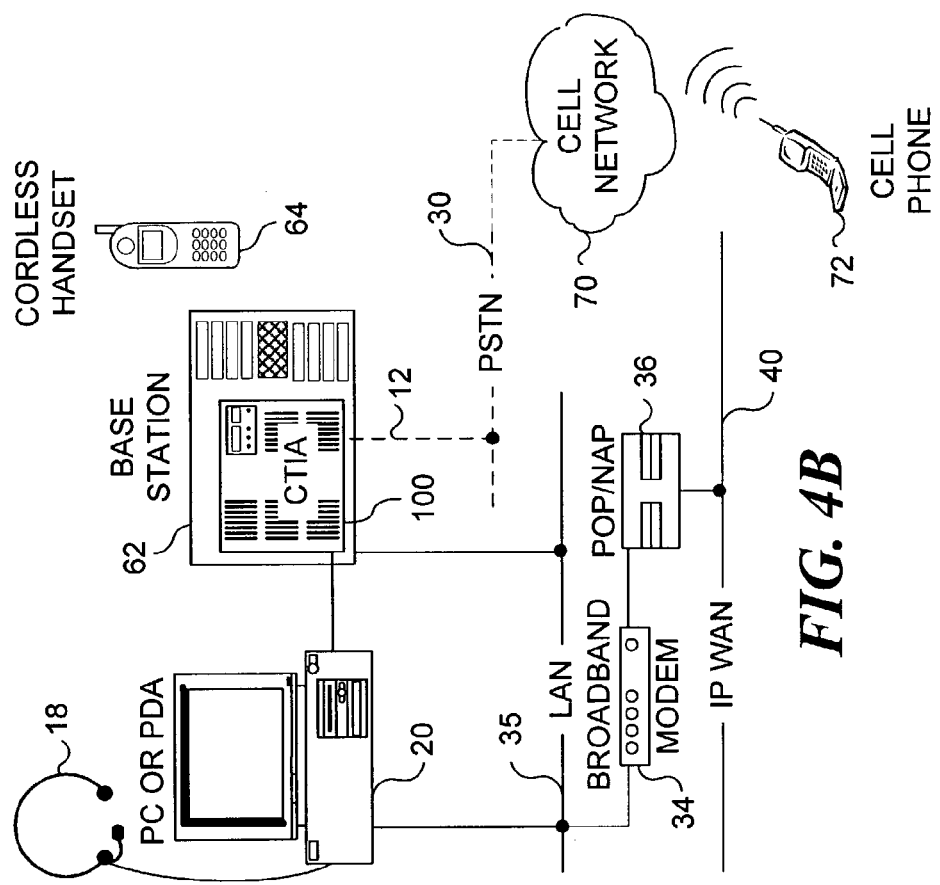
FIG. 4B is a functional block diagram illustrating another alternative preferred embodiment wherein the CTIA is incorporated into a cordless telephone base station.
Figure 4A:
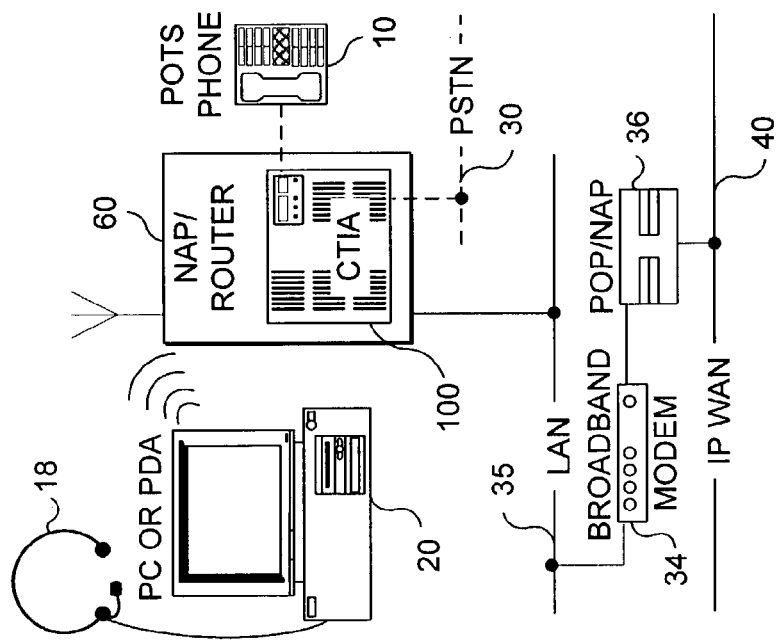
FIG. 4A is a functional block diagram illustrating an alternative preferred embodiment wherein the CTIA is incorporated into a data network device.

FIG. 4A is a functional block diagram illustrating an alternative preferred embodiment in which CTIA 100 is incorporated into a data network device 60. Data network device 60 may comprise a wireless NAP, a router, a gateway, a bridge, a switch, a network interface card (NIC), or other network device and may be in communication with a computing device, such as PC 20, and may communicate over a LAN 35, and/or IP WAN 40. Thus, CTIA 100 may communicate with one or more other computing devices via networking components of network device 60. In any case, however, CTIA 100 remains coupled to telephone 10 and telephone network 30.

FIG. 4B is a functional block diagram illustrating another alternative preferred embodiment in which CTIA 100 is incorporated into a cordless telephone base station 62. Cordless telephone base station 62 comprises a conventional radio frequency transmitter and receiver to communicate with a cordless handset 64, and comprises a conventional data communication interface for communicating with a computing device such as PC 20, and may communicate over a LAN 35, and/or IP WAN 40. In any case, CTIA 100 is also in communication with conventional telephone network 30. CTIA 100 may also be in communication with a cellular telephone network 70, enabling multiplexed communication between a conventional telephone, a computing device, and a cellular telephone 72.

Figure 5:
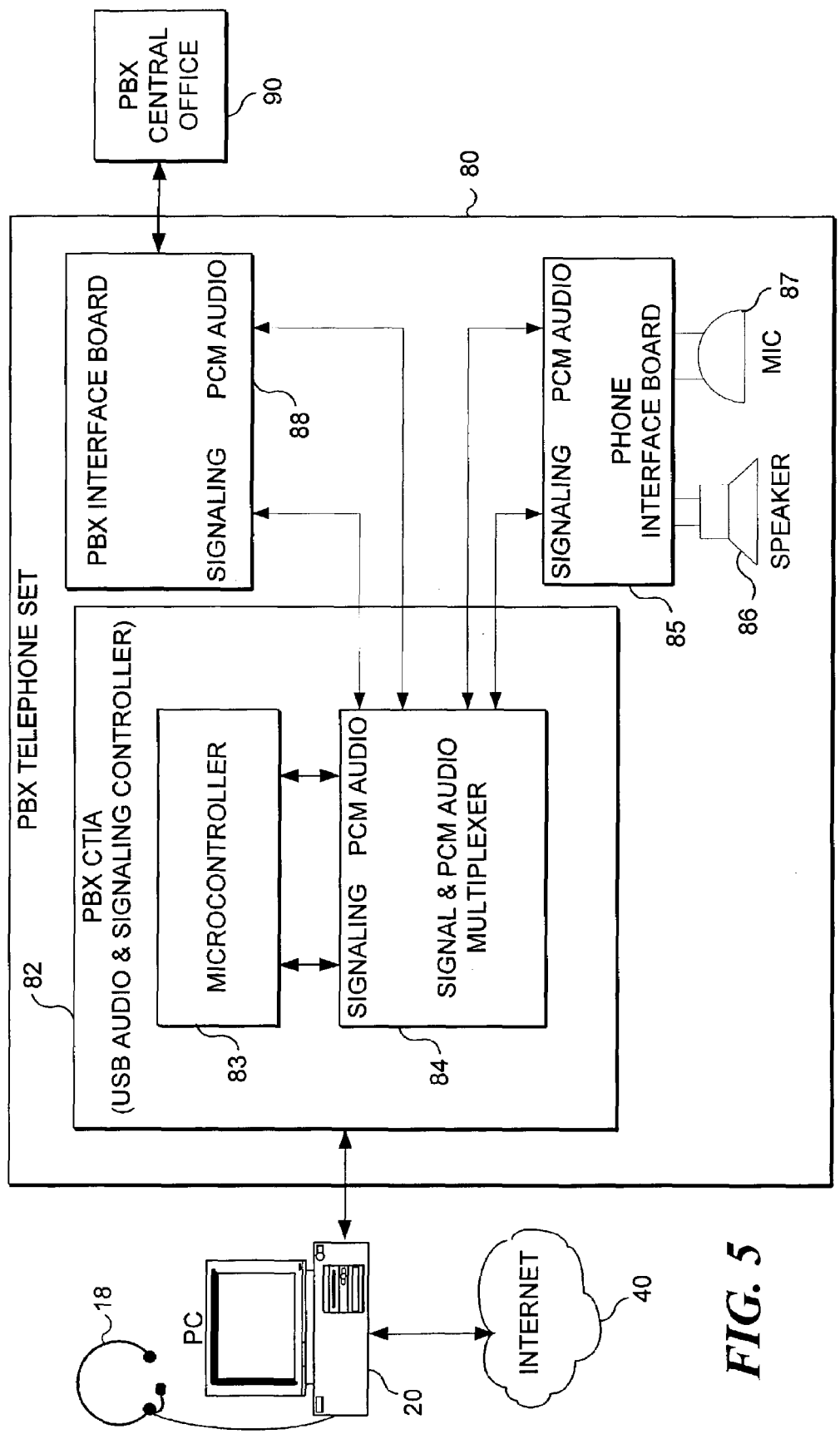
FIG. 5 is a functional block diagram illustrating yet another preferred embodiment wherein the functionality of the CTIA is incorporated into a PBX telephone set.

FIG. 5 is a functional block diagram illustrating yet another preferred embodiment wherein the functionality of CTIA 100 is incorporated into a PBX telephone set 80. PBX communication may be analog or digital, and the functionality of CTIA 100 can be incorporated into either analog or PBX telephone systems. However, for exemplary purposes, FIG. 5 illustrates a digital PBX telephone set 80. For this illustration, many of the analog components of CTIA 100 are not needed. Thus, the CTIA functionality described above is instead provided by a digital PBX CTIA 82. PBX CTIA 82 controls the USB audio and signaling functions, along with other interface functions for communicating with conventional PBX telephone set components. PBX CTIA 82 comprises a microcontroller 83, such as a CY7C68013-128AC USB microcontroller from Cypress Semiconductor Corporation. Microcontroller 83 is programmed to coordinate communication with PC 20 and to control switching functions and perform other logic functions to control CTIA 82, such as those described above with regard to CTIA 100, and described in further detail below. Microcontroller 83 is in communication with a signal and pulse code modulation (PCM) audio multiplexer 84, such as an EPM7064AETC100-10 from Altera Corporation. Multiplexer 84 multiplexes multiple sets of parallel PCM data and serial signaling data (e.g. RS232 serial data) between microcontroller 83, a conventional phone interface board 85, and a conventional PBX interface board 88. Conventional phone interface board 85 provides audio signals to a speaker 86 and receives audio signals from a microphone 87. Conventional PBX interface board 88 communicates signaling data and PCM audio data between multiplexer 84 and a PBX central office 90. Those skilled in the art will recognize that PBX CTIA 82 may include other conventional components, such as RAMs, ROMs, communication ports, power supplies, etc. that are not shown. Those skilled in the art will also recognize that PBX CTIA 82 may comprise a single chip, or a separate device that is coupled between the computing device and a conventional PBX telephone.

Software Architecture

Figure 6:
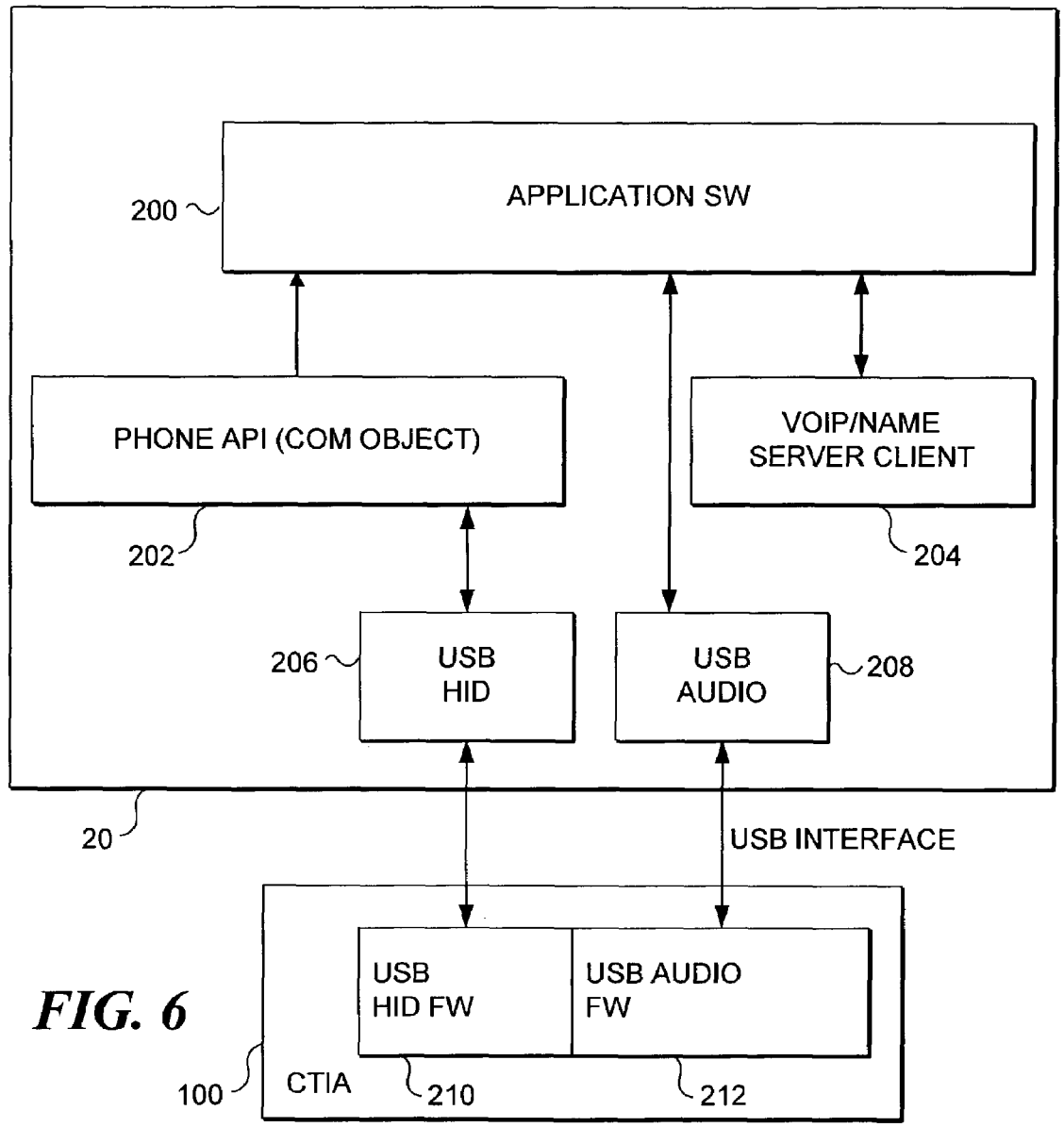
FIG. 6 is a functional block diagram illustrating an exemplary architecture of software modules that control functions of the CTIA and the computing device.

FIG. 6 is a functional block diagram illustrating an exemplary architecture of software modules that control functions of the CTIA and the computing device. In this Figure, an application software module 200 is executed by PC 20 to enable a user to communicate with and control CTIA 100. The software application module may comprise a stand-alone application or be integrated into another module, such as another application, or be included in an operating system. Application software module 200 is coupled to a telephone application program interface (API) 202, which is preferably a component object model (COM) object. This API is executed on the PC to provide an interface to the telephone that is coupled to the PC through the CTIA. Application software module 200 is also coupled to a USB audio port 208 and to a VOIP/name server 204, providing VOIP communication to other devices. USB audio module 208 provides a communication link with a USB audio firmware module 212, portions of which may be executed by the USB audio CODEC, as discussed above. Similarly, telephone API 202 is coupled to a USB human interface device (HID) module 206, which in turn communicates with a USB HID firmware module 210 of the CTIA. The USB HID firmware may be executed by USB signaling controller discussed above and preferably provides communication of signaling data, such as DTMF data. Preferably, DTMF data associated with a non-numeric key of the telephone, such as the * key or # key, will be used to distinguish commands from the handset keys that are depressed for dialing or for entering other conventional telephone control options, such as when selecting voicemail options.

Functional Scenarios

Figure 7A:
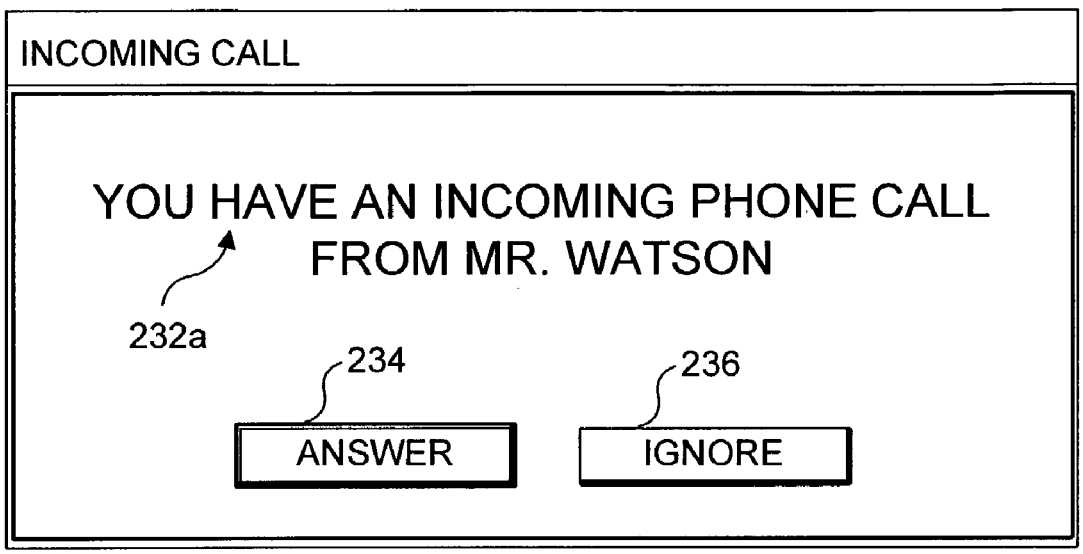
FIG. 7A is a screen print illustrating a dialog box that is displayed to a user of the computing device to notify the user of an incoming PSTN telephone call.

FIG. 7A is a screen print illustrating a dialog box 230a that is displayed to a user of the computing device to notify the user of an incoming conventional telephone call. As discussed above, the CTIA detects a ring signal from the conventional telephone network, and notifies the computing device via the data communication interface (e.g., through the USB port). Dialog box 230a is displayed when the user is not engaged in any other call (conventional or VOIP). Alternatively, dialog box 230 may be displayed when the user is already engaged in another call. In that case, the CTIA and computing device provide a call waiting function. Dialog box 230a includes a message 232a indicating that the incoming telephone call is from a conventional telephone network, such as from either the PSTN or PBX network. Message 232a may also indicate an identity of the caller. As discussed above, the CTIA decodes FSK data from the conventional telephone network and relays the FSK data to the computing device. Based on the telephone number represented in the FSK data, the computing device can then perform a reverse number lookup to determine the name of a person associated with the telephone number. The name is inserted into message 232a.

Dialog box 230a also includes an answer button 234 that enables the user to accept the conventional telephone call through the computing device. If accepted, the conventional telephone call is passed through the CTIA to the computing device. More specifically, the conventional telephone signals are converted to data communication signals and relayed to the computing device. Those skilled in the art will recognize that the incoming conventional telephone call could instead be accepted simply by lifting the handset of the telephone connected to the CTIA. Lifting the handset causes the CTIA to detect an off hook state of the conventional telephone, causing the CTIA to disconnect the incoming conventional telephone call from the computing device and pass the incoming conventional telephone call to the conventional telephone.

Dialog box 230a further includes an ignore button 236, which enables the user to refuse to accept the incoming conventional telephone call. Those skilled in the art will recognize that selecting ignore button 236 will cause the CTIA to disconnect the incoming conventional telephone call, or pass the incoming conventional telephone call to another function, such as a message recording function.

Figure 7B:
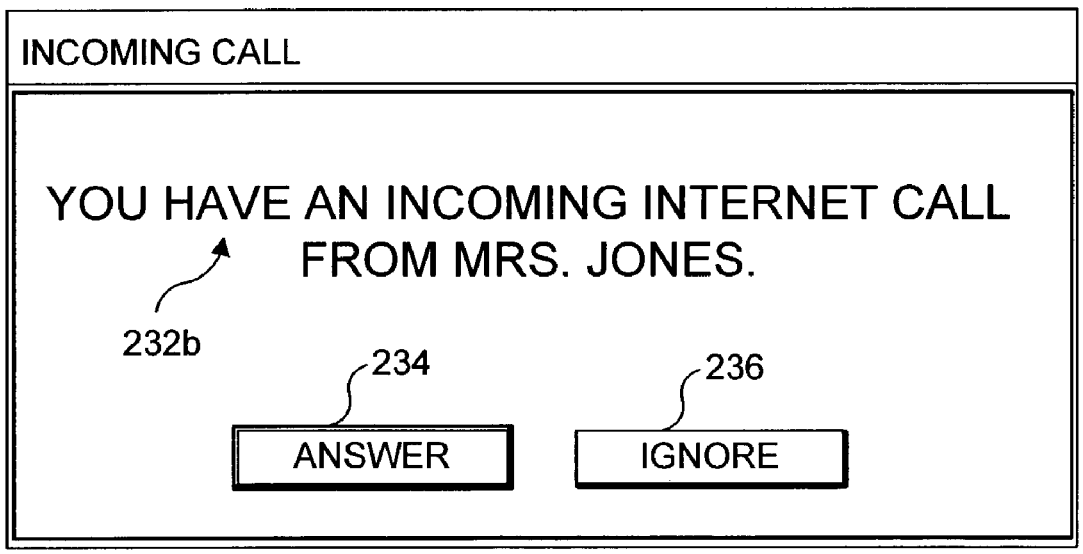
FIG. 7B is a screen print illustrating a dialog box that is displayed to a user of the computing device to notify the user of an incoming VOIP call.

FIG. 7B is a screen print illustrating a dialog box 230b that is displayed to a user of the computing device to notify the user of an incoming VOIP call. As above, Dialog box 230b is displayed when the user is not engaged in any other call, or when the user is already engaged in another call (e.g., VOIP call waiting). Dialog box 230b includes a message 232b that identifies the network source of the incoming VOIP call, and identifies the caller. Whereas a conventional caller may be identified by FSK data, as illustrated in FIG. 7A, a VOIP caller is identified by a network address detected by the computing device. In this case, the computing device performs a reverse lookup based on the network address to determine the identity of the caller. In addition to displaying message 232b, the computing device may communicate a ring indication to the CTIA, which can generate a ring signal (via the SLIC chip) to cause the conventional telephone to ring. Dialog box 230b of FIG. 7B further includes answer button 234 and ignore button 236 to perform the functions described above.

Figure 8A:
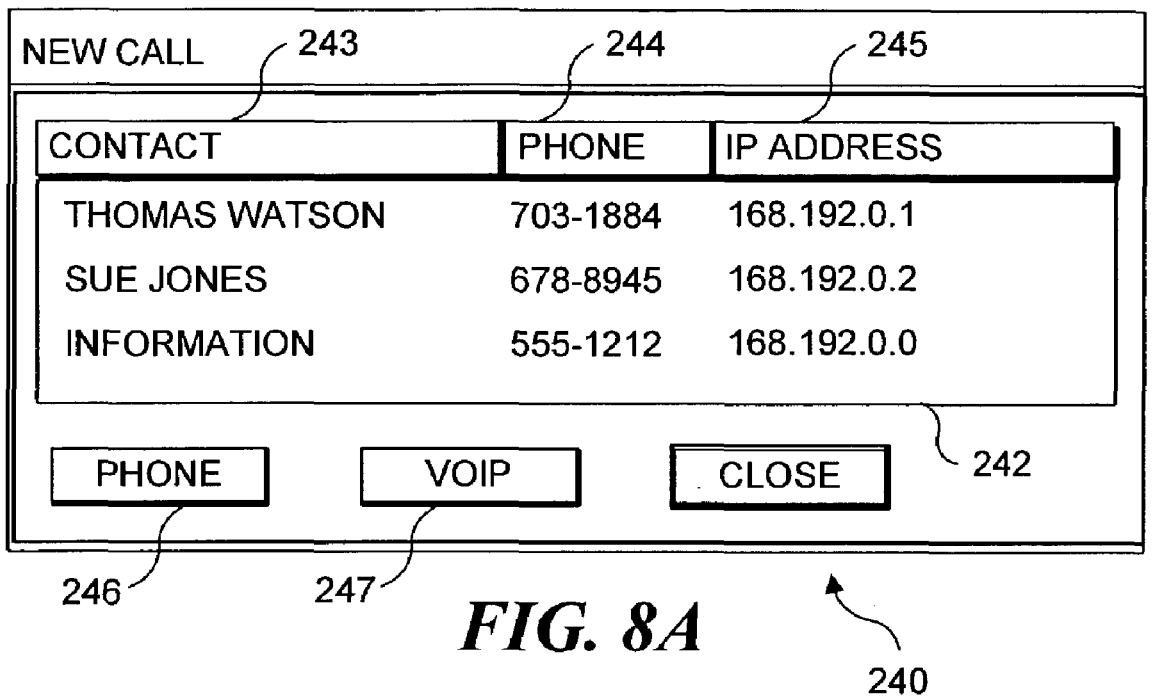
FIG. 8A is a screen print of a call initiation dialog box.

FIG. 8A is a screen print of a call initiation dialog box 240. Call initiation dialog box 240 comprises a contact list 242. Contact list 242 includes contact names 243 and corresponding conventional telephone numbers 244. Contact list 242 may further include network addresses 245 that are associated with each contact name. A user may select one of the contact names from contact list 242 by clicking on the contact name that the user wishes to call via a conventional telephone network or an IP network. Alternatively, the user may select a contact name by speaking the contact name into a microphone connected to the computing device or by speaking the contact name into the telephone. If spoken into the telephone, the CTIA converts the telephone audio signal into a digital audio signal (e.g., with the USB audio CODEC) and communicates the digital audio signal to the computing device. The computing device then interprets the digital audio signal with a voice recognition module and attempts to match the interpretation to one of the contact names.

After selecting a contact, the user may select a phone button 246 to initiate a call with the selected user via the conventional PSTN. Accordingly, the computing device will instruct the CTIA to initiate communication between the computing device and the PSTN. The computing device will provide the PSTN telephone number to the CTIA. The CTIA will then provide an off hook signal to the PSTN and generate the corresponding DTMF tones (e.g., via the SLIC chip) for input to the PSTN to establish communication with the selected telephone number.

Alternatively, the user may select a VOIP button 247 to initiate a VOIP call over an IP network. Accordingly, the computing device will establish IP communication with the IP network and use the IP address associated with the selected contact to establish communication with the computing device. In this case, the CTIA is not used to establish the VOIP call. However, those skilled in the art will recognize that the CTIA controls rerouting of the VOIP call from the computing device to the conventional telephone if the user lifts the handset of the conventional telephone. Specifically, when the user lifts the handset of the conventional telephone, the CTIA detects the corresponding off hook state of the conventional telephone. The CTIA will notify the computing device of the off hook state. The computing device will then instruct the CTIA to switch the telephone state switch so that the telephone is coupled to the computing device and also route the audio data of the VOIP call from the headset connected to the computing device over to the USB port that is coupled to the CTIA. The CTIA will then convert the audio data of the VOIP call into signals that are compatible with the conventional telephone and route the signals thus converted to the conventional telephone.

If the VOIP call fails, however, (e.g., the IP network connections fails, the computing device crashes, etc.) the CTIA can detect the failure via the interface with the computing device. For instance, the CTIA controller may detect a timeout of watchdog timer if an acknowledgement signal is not received with the timeout period. The CTIA will then switch the conventional telephone back to the PSTN. Because the telephone handset will be off hook, the PSTN will provide a conventional dial tone, which indicates to the user that the VOIP call failed. A converse failure management function can be performed if a PSTN call fails while the user is communicating through the PC headset (e.g., the PSTN line is broken by a falling tree, etc.). In that case, the user will hear a VOIP dial tone.

Those skilled in the art will recognize that a contact name and number need not be included in the contact list to make a PSTN or VIOP call. Instead, the user can enter a telephone number or an IP address via the computing device keyboard or via the telephone keypad. For example, the user can lift the telephone handset and press one or more predefined keys on the telephone keypad to command the USB signaling controller to switch the telephone to the computing device for a VOIP call. The computing device or the USB signaling controller can provide a distinct VOIP dial tone back to the telephone so that the user understands that the telephone is switched to communicate with the computing device. The user can then enter an IP address with the telephone keypad. The SLIC chip will convert the DTMF tones from the telephone keypad into digital format, and the USB signaling controller will pass the IP address to the computing device, which establishes the VOIP call. An inverse conversion process will occur if the user entered a PSTN telephone number with the computing device keyboard to generate DTMF, which will establish a PSTN call.

Figure 8B:
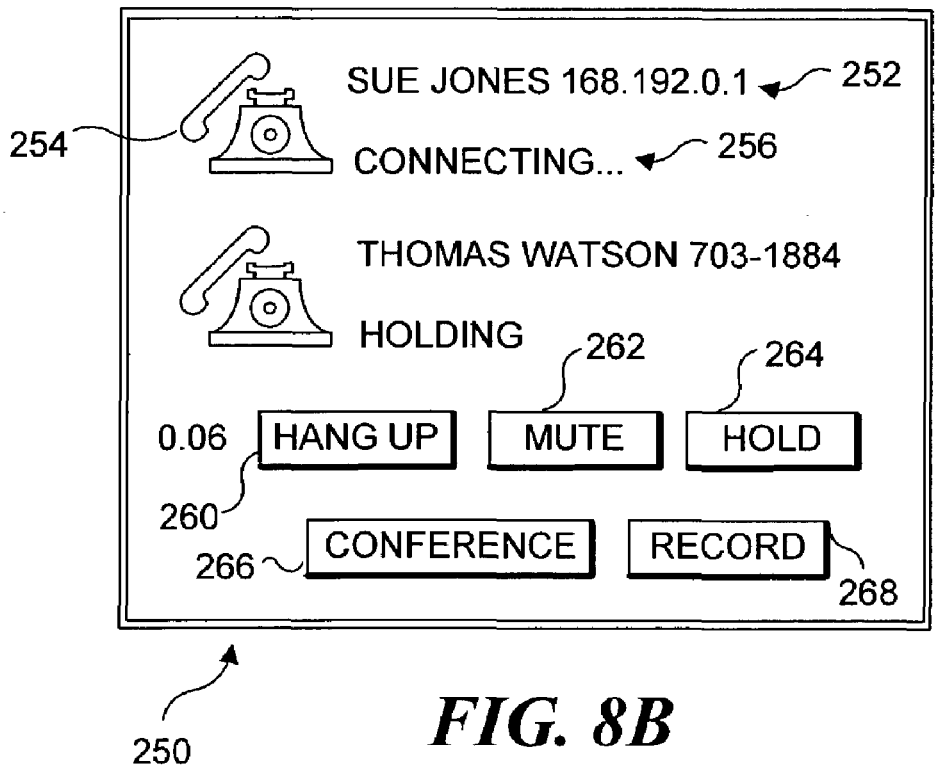
FIG. 8B is a screen print of a call status dialog box.

FIG. 8B is a screen print of a call status dialog box 250 that is displayed to the user of the computing device when a call is initiated or active. Call status dialog box 250 preferably displays a selected call number 252 corresponding to the conventional telephone number or IP address of the contact with whom the user desires to communicate. Call status dialog box 250 also includes a status icon 254 illustrating a status of the current call. For instance, status icon 254 illustrates a telephone with the handset lifted, indicating that an off hook signal has been detected and a call is being initiated. Correspondingly, a status message 256 specifies the current state of processing. If the user is engaged in a three-way call, call status dialog box 250 can display the contact and status information of each active call.

Call status dialog box 250 further includes a hang-up button 260 to enable the user to terminate the current call. The computing device interprets selection of hang-up button 260 in different ways depending on whether the current call is over the conventional telephone network or over an IP network. If the current call is a VOIP call, the computing device terminates VOIP communication with the IP network upon the user selecting hang-up button 260. However, if the user is engaged in a VOIP call using the conventional telephone, the computing device also issues a notice to the CTIA that the VOIP call was terminated, which causes the CTIA to switch the telephone to a default state or perform another operation. Call status dialog box 250 further includes a mute button 262, which is selected by the user to suspend audio communication. Again, the computing device can perform internal functions to suspend a VOIP call and/or provide information to the CTIA to suspend either a VOIP call using the conventional telephone or a PSTN call using the conventional telephone.

Call status dialog box 250 further includes a hold button 264 to enable the user to place a call on hold. If the current call includes a PSTN call, pressing hold button 264 causes the computing device to send an instruction to the CTIA to command the on/off hook/hold switch to change to a hold state. Similarly, if the PSTN call is already on hold, pressing hold button 264 causes the computing device to send an instruction to the CTIA to command the on/off hook/hold switch to change to a state of resumed communication over the PSTN. If the user is engaged in a VOIP call, pressing hold button 264 causes the computing device to suspend communication through the IP network. If the user is engaged in a three-way call, the user can first select the specific call to place on hold before pressing hold button 264.

Call status dialog box 250 additionally includes a conference button 264 that enables the user to establish a conference call with multiple active calls. For example, the user can first establish a PSTN call and place the call on hold. The user can then establish a VOIP call and press conference button 266 to release the PSTN call from the hold state and combine the two calls, forming the conference call. Alternatively, the user can keep the PSTN call active and select a menu option on the computing device to initiate a VOIP call. In this case, the parties to the PSTN call will hear the establishment of the VOIP call.

Call status dialog box 250 may also include other information about the person(s) being called (or about the person who called the user). For example, call status dialog box 250 may indicate whether any of the other parties are currently signed into an instant messaging service, whether another party is capable of network collaboration, etc. This status information can also be displayed in call initiation dialog box 240 and/or when the user initiates a conventional or VOIP call to another party. To display this information in status dialog box 250, the computing device simply performs a reverse lookup based on the DTMF data entered by the user on the telephone handset or based on the network address selected by the user. Call status dialog box 250 can include a record button 268 that can be selected to enable a user to record a currently active call (or three-way call).

Call status dialog box 250, an application menu, or other user interface can additionally enable the user to switch a call between the telephone, the headset connected to the computing device, or external speaker(s) and a microphone. The computing device can also perform background functions, such as logging all inbound and/or outbound conventional and/or VOIP calls. Logged data can identify the initiating party and include the date, the start time, the end time, the duration, etc. Those skilled in the art will recognize that numerous other functions can be controlled with the computing device in communication with the CTIA.

Exemplary Process

FIG. 9 is a flow diagram illustrating logic to establish a three-way conference call, wherein one call is established over the PSTN and another call is established over the IP network. FIG. 9 represents logic from the perspective of a CTIA that is generally configured as shown in FIG. 2. At a step 300 of FIG. 9, a PSTN call is established. More specifically, at a step 302, when a user lifts the handset of the conventional telephone, the CTIA detects an off hook state and notifies the computing device. At a step 304, the user dials a desired telephone number. Because the default communication pathway in the CTIA for the telephone is directly to the PSTN interface, the DTMF tones generated by the telephone are passed directly to the PSTN. Once the PSTN call is established, the user may optionally put the PSTN call on hold, at a step 310. The user may press a hold button on the telephone itself, at a step 312. However, as described above, the user may alternatively click a hold button in a dialog window displayed on the PC or enter a command by pressing predefined keys on the telephone keypad, at a step 314. In these latter cases, the CTIA commands a hook/hold switch to the hold state. A separate hook/hold switch that is in the communication path between the telephone and the PSNT is needed if the hold state is initiated without first switching the telephone to the PC communication path that also goes to the PSTN.

If the telephone has not been switched to the PC communication path, the CTIA switches the telephone to the PC communication path, at a step 320. For example, the user can press a predefined sequence of keys on the telephone keypad (e.g., "#8"), at a step 322, which the CTIA will recognize as a command to change the telephone state switch to the PC communication path. Alternatively, the user can enter a switch command through the PC. In either case, the CTIA detects the command to switch the telephone state switch to the PC communication path, at a step 324. More specifically, the USB signaling controller detects the command and causes the telephone state switch to connect the telephone to the PC communication path, at a step 326. The user can then establish a VOIP call, at a step 328, in any of the various ways described above.

Once the VOIP call is established, the user can engage in the three-way conference call, at a step 330. If the PSTN call was not previously put on hold, the three-way call automatically engages via the PC communication path. However, if the PSTN call was previously put on hold, the user must release the PSTN hold, at a step 332, and/or click on the conference button through the PC, at a step 334. The USB signaling controller ensures that the on/off hook/hold switch along the PC-to-PSTN path is switched to the off hook state, at a step 336, which completes the connection to the PSTN.

Those skilled in the art will recognize that other logical steps can be used to achieve the various scenarios described above. These logical steps are preferably incorporated into the PC software modules and the CTIA firmware modules discussed above.

Exemplary Computing Device

FIG. 10 and the following discussion are intended to provide a brief, general description of a suitable computing device for use in connection with implementing the present invention. Although not required, a portion of the present invention is described in the general context of computer executable instructions, such as program modules that are executed by a PC. Generally, program modules include routines, programs, objects, components, data structures, etc. that perform particular tasks or implement particular abstract data types. Those skilled in the art will appreciate that this invention may be practiced in connection with other computing system configurations that may include mainframe computers, minicomputers, multiprocessor systems, network PCs, pocket personal computing devices, game consoles, TV set-top boxes, stereo consoles, appliances, hand held devices, peripheral devices, digital cell phones, industrial control equipment, automotive equipment, aerospace equipment, and other microprocessor-based or electronic devices. The invention can also be practiced in distributed computing environments where tasks are performed by remote processing devices that are linked through one or more data communications networks. In a distributed computing environment, program modules may be located in both local and remote memory storage devices.

With reference to FIG. 10, an exemplary computing device is described in the form of conventional PC 20. PC 20 is provided with a processing unit 421, a system memory 422, and a system bus 423. The system bus couples various system components, including the system memory, to processing unit 421 and may be any of several types of bus structures, including a memory bus or memory controller, a peripheral bus, and a local bus using any of a variety of bus architectures. The system memory includes read-only memory (ROM) 424 and random access memory (RAM) 425. A basic input/output (BIOS) system 426, containing the basic routines that help to transfer information between elements within PC 20, such as during start up, is stored in ROM 424.

PC 20 further includes a hard disk drive 427 for reading from and writing to a hard disk (not shown), a magnetic disk drive 428 for reading from or writing to a removable magnetic disk 429, and an optical disc drive 430 for reading from or writing to a removable optical disc 431, such as a CD-ROM or other optical media. Hard disk drive 427, magnetic disk drive 428, and optical disc drive 430 are connected to system bus 423 by a hard disk drive interface 432, a magnetic disk drive interface 433, and an optical disc drive interface 434, respectively. The drives and their associated computer-readable media provide nonvolatile storage of computer-readable machine instructions, data structures, program modules, and other data for PC 20. Although the example environment described herein employs a hard disk, a removable magnetic disk 429, and a removable optical disc 431, it will be appreciated by those skilled in the art that other types of computer-readable media, which can store data that are accessible by a computer, such as magnetic cassettes, flash memory cards, digital video discs, Bernoulli cartridges, RAMs, ROMs, and the like, may also be used in the example operating environment. A number of program modules may be stored on the hard disk, magnetic disk 429, optical disc 431, ROM 424, or RAM 425, including an operating system 435, one or more application programs 436, other program modules 437, and program data 438.

A user may enter commands and information into PC 20 through input devices such as a keyboard 440 and a pointing device 442. Other input devices (not shown) may include a microphone, joystick, game pad, satellite dish, scanner, or the like. These and other input devices are often connected to processing unit 421 through an input/output (I/O) device interface 446 that is coupled to the system bus. Output devices, such as a printer (not shown), may also be connected to processing unit 421 through I/O device interface 446 that is coupled to the system bus. The term I/O device interface is intended to encompass each interface specifically used for a (USB) port, a serial port, a parallel port, a game port, a keyboard port, a PS/2 port, and/or other communication port. Similarly, a monitor 447 or other type of display device is also connected to system bus 423 via an appropriate interface, such as a video adapter 448, and is usable to display graphical user interfaces, images, Web pages, and/or other information.

In addition to the monitor, PCs are often coupled to other peripheral output devices (not shown), such as speakers (through a sound card or other audio interface (not shown)).

PC 20 may operate in a networked environment using logical connections to one or more remote sources, such as a remote computer 449. Remote computer 449 may be another PC, a server (which is typically generally configured much like PC 20), a router, a network PC, a peer device, a satellite, or other common network node, and typically includes many or all of the elements described above in connection with PC 20, although only an external memory storage device 450 has been illustrated in FIG. 10. In a networked environment, program modules depicted relative to PC 20, or portions thereof, may be stored in the remote external memory storage device. The logical connections depicted in FIG. 10 include LAN 35 and WAN 40 as discussed above. Such networking environments are common in offices, enterprise-wide computer networks, intranets, and the Internet.

When used in a LAN networking environment, PC 20 is connected to LAN 35 through a network interface or adapter 453. When used in a WAN networking environment, PC 20 often includes a broadband modem 34 or other means for establishing communications over WAN 40, such as the Internet. Broadband modem 34, which may be internal or external, is typically coupled directly to the system bus via an internal slot, coupled to the bus via I/O device interface 446, or coupled to the bus via network interface 453. It will be appreciated that the network connections shown are example and other means of establishing a communications link between the computers may be used, such as wireless communication and wide band network links.

Although the present invention has been described in connection with the preferred form of practicing it and modifications thereto, those of ordinary skill in the art will understand that many other modifications can be made to the present invention within the scope of the claims that follow. For example, the CTIA can be inserted at the point where the conventional telephone network enters a subnetwork of conventional telephones. Such a subnetwork is exemplified by the phone lines in a home that enable use of multiple handsets in the home. Thus, all phones in the home would go through the CTIA, enabling each phone in the home to benefit from the functions provided by the CTIA. Other features may also be provided using the CTIA. For instance, a custom ring tone can be downloaded through the computing device and generated in the CTIA when a ring signal is detected. Also, a media detector can be included that determines the sampling rate and data size that a detected media can accommodate. A controller in the CTIA can scale the frequency and/or data size as appropriate for the detected media, enabling higher quality audio, such as 16 KHz and 16 bits, rather than PSTN quality audio of 4 KHz and 8 bits. Accordingly, it is not intended that the scope of the invention in any way be limited by the above description, but instead be determined entirely by reference to the claims that follow.

The invention in which an exclusive right is claimed is defined by the following:

1. A computer telephony interface adapter (CTIA) for interfacing a computing device, a telephone, and a telephone network, comprising:
    (a) a telephone network interface for communicating with the telephone network according to a telephone network protocol, wherein the telephone network protocol comprises one of a public switched telephone network (PSTN) protocol and a private branch exchange protocol;
    (b) a telephone interface for communicating with the telephone;
    (c) a computer interface for communicating with the computing device according to a data communication protocol, wherein the computing device is connected to a data network;
    (d) a controller in communication with the telephone network interface and with the computer interface, said controller converting between the telephone network protocol and the data communication protocol; and
    (e) a switch that selectively couples the telephone in communication with the telephone network and the computing device at the same time to enable:
        conferencing a call over the telephone network with a call over the data network on either the telephone or the computing device, and
        sharing data from the telephone network and the data network on either the telephone or the computing device.

2. The CTIA of claim 1, wherein the computer interface comprises one of:
    (a) a universal serial bus (USB) interface; and
    (b) a wireless communication interface.

3. The CTIA of claim 1, wherein the controller comprises one of:
    (a) a coder/decoder for converting between digital signals and analog telephone network signals; and
    (b) a multiplexer for multiplexing data for communication with a private branch exchange (PBX) telephone network.

4. The CTIA of claim 3, wherein the coder/decoder includes a subscriber line interface circuit (SLIC) and an analog telephone power source.

5. The CTIA of claim 4, wherein the coder/decoder further includes:
    (a) an audio coder/decoder that converts audio signals between the telephone network protocol and the data communication protocol; and
    (b) a signaling controller that converts signaling data between the telephone network protocol and the data communication protocol.

6. The CTIA of claim 1, wherein the controller detects an interruption in communication between the computer interface and the computing device and causes the switch to couple the telephone in communication only with the telephone network.

7. The CTIA of claim 1, further comprising a transformer having a first winding and a second winding, wherein the first winding of the transformer is in communication with the controller and the second winding of the transformer is in communication with the telephone network interface, to provide electrical isolation between the controller and the and the telephone network interface, while enabling communication.

8. The CTIA of claim 1, further comprising a hook switch coupled to the controller, the telephone network interface, and a hold circuit, said controller controlling the hook switch to selectively couple an input of the controller to one of the telephone network interface and the hold circuit, so that when the hook switch is selectively controlled by the controller to couple the controller input to the telephone network interface, communication can occur between the computing device and the telephone network.

9. The CTIA of claim 1, further comprising a frequency shift keying (FSK) decoder in communication with the telephone network interface and in communication with the controller, said FSK decoder decoding FSK data from signals received from the telephone network interface, and said FSK decoder providing the FSK data to the controller for communication to the computing device.

10. The CTIA of claim 1, further comprising at least one of:
   (a) an off hook detector in communication with the switch and with the controller, said off hook detector detecting an off hook state of the telephone and notifying the controller of the off hook state; and
   (b) a ring detector in communication with the telephone network interface and in communication with the controller, said ring detector detecting a ring signal from the telephone network and notifying the controller of the ring signal.

11. The CTIA of claim 1, wherein the telephone network interface comprises one of:
   (a) an analog line protection circuit for communicating according to an analog telephone network protocol; and
   (b) a PBX interface for communicating according to a digital telephone network protocol.

12. The CTIA of claim 1, further comprising at least one of:
   (a) a wide area network (WAN) interface in communication with the computer interface to enable communication between the computing device and a WAN; and
   (b) a local area network (LAN) interface in communication with the computer interface to enable communication between the computing device and a LAN.

13. The CTIA of claim 1, wherein the telephone interface comprises one of:
   (a) a conductor connecting the telephone interface in communication with the telephone; and
   (b) a wireless interface for wirelessly coupling the telephone interface in communication with the telephone.

14. A method for selectively coupling signaling data and audio signals among a telephone, a telephone network, and a computing device, the method comprising the steps of:
   (a) establishing communication between the telephone and the telephone network through a computer telephony integration adapter (CTIA) over a telephone-to-telephone network (T-TN) communication path between the telephone and the telephone network, said T-TN communication path enabling communication of the signaling data and audio signals according to telephone network protocols, wherein the telephone network protocols comprise at least one of a public switched telephone network (PSTN) protocol and a private branch exchange protocol;
   (b) establishing communication between the telephone and the computing device through the CTIA over a telephone-to-computer (T-C) communication path between the telephone and the computing device, wherein the computing device is connected to a data network, said T-C communication path including a converter that converts the signaling data and audio signals between the telephone network protocols and data communication protocols used by the computing device; and
   (c) establishing communication between the T-TN communication path and the T-C communication path so that the signaling data and the audio signals on the T-TN path are processed by the converter, thereby enabling sharing of the signaling data and the audio signals among the telephone, the computing device, and the telephone network at the same time to enable:
      conferencing a call over the telephone network with a call over the data network on either the telephone or the computing device, and
      sharing data from the telephone network and the data network on either the telephone or the computing device.

15. The method of claim 14, wherein the step of establishing communication between the telephone and the telephone network comprises the step of establishing outgoing communications, said step of establishing outgoing communications comprising the steps of:
   (a) detecting on off hook status of the telephone with the CTIA;
   (b) causing the CTIA to notify the computing device of the off hook status;
   (c) communicating dual tone multi-frequency (DTMF) signals along the T-C communication path to the computing device;
   (d) communicating the DTMF signals along the T-TN communication path to the telephone network; and
   (e) communicating signaling data and audio signals received from the telephone network, indicating that a call is established, to the telephone through the telephone network, along the T-TN communication path.

16. The method of claim 14, wherein the step of establishing communication between the telephone and the telephone network comprises the step of establishing incoming communications, said step of establishing incoming communications comprising the steps of:
   (a) detecting a ring signal with the CTIA;
   (b) causing the CTIA to notify the computing device of the ring signal; and
   (c) receiving signaling data and audio signals from the telephone network along the T-TN communication path, when the telephone is set to an off hook state.

17. The method of claim 16, wherein the step of establishing incoming communication further comprises the steps of:
   (a) decoding frequency shift keying (FSK) signaling data from the telephone network to produce decoded FSK data; and
   (b) causing the CTIA to communicate the decoded FSK data to the computing device.

18. The method of claim 17, wherein the step of decoding the FSK signaling data comprises the steps of:
   (a) detecting a high FSK signal;
   (b) staffing a timer;
   (c) detecting a transition to a low FSK signal;
   (d) determining a time between starting the timer and detecting the transition to the low FSK signal;
   (e) determining that an FSK bit is a 1 if the time is greater than zero; and
   (f) determining that an FSK bit is a 0 if the time is one of less than and equal to zero.

19. The method of claim 14, wherein the step of establishing communication between the telephone and the computing device comprises the steps of:
   (a) causing a request to be made for data communication between the computing device and the CTIA, said request conforming to the data communication protocols;
   (b) establishing the data communication that was requested; and
   (c) providing power in conformance with the telephone network protocols to the telephone, through the T-TN communication path between the converter and the telephone, said power energizing the telephone independent of the telephone network.

20. The method of claim 19, further comprising the steps of:
   (a) detecting an interruption in the data communication between the computing device and the CTIA;

(b) suspending the communication between the telephone and the computing device through the CTIA over the telephone-to-computer (T-C) communication path; and (c) providing an indication that the communication between the telephone and the computing device is interrupted.

21. The method of claim 14, further comprising the step of establishing a voice over Internet protocol (VOIP) communication, while maintaining a communication among the telephone, the telephone network, and the computing device with the CTIA.

22. The method of claim 14, further comprising the step of switching the communication of the signaling data and audio signals for the telephone network to a hold state, thereby suspending communication of the signaling data and audio signals between the telephone network and one or both of the telephone and the computing device.

23. A memory medium on which machine instructions are stored for carrying out the steps of claim 14.

24. A computer telephony interface adapter (CTIA) for interfacing a telephone, a telephone network, and a computing device, comprising:

(a) a telephone-to-telephone network (T-TN) communication path, enabling communication of signaling data and audio signals according to telephone network protocols between a telephone and a telephone network, wherein the telephone network protocols comprise at least one of a public switched telephone network (PSTN) protocol and a private branch exchange protocol;

(b) a telephone-to-computer (T-C) communication path enabling communication of signaling data and audio signals between the telephone and a computing device, wherein the computing device is connected to a data network, said T-C communication path including a converter that converts the signaling data and audio signals between the telephone network protocols and data communication protocols used by a computing device;

(c) a computer-to-telephone network (C-TN) communication path enabling communication of signaling data and audio signals between the computing device and the telephone network, said C-TN communication path using the converter that converts the signaling data and audio signals between the telephone network protocols and data communication protocols used by the computing device; and (d) a common connection coupling the T-TN communication path, the T-C communication path, and the C-TN communication path, to enable sharing of the signaling data and audio signals among a telephone, a telephone network, and a computing device at the same time to enable:

conferencing a call over the telephone network with a call over the data network on either the telephone or the computing device, and sharing data from the telephone network and the data network on either the telephone or the computing device.

25. A method for controlling communication of signaling data and audio signals among a telephone, a telephone network, and a computing device, the method comprising the steps of:

(a) communicating an off hook instruction to a computer telephony integration adapter (CTIA) according to a data communication protocol over a data network, causing the CTIA to initiate communication with the telephone network according to a telephone network protocol, wherein the telephone network protocol comprises one of a public switched telephone network (PSTN) protocol and a private branch exchange protocol;

(b) communicating a telephone number to the CTIA according to the data communication protocol, causing the CTIA to convert the telephone number into a sequence of dual tone multi-frequency (DTMF) signals that are communicated to the telephone network according to the telephone network protocol, to place a telephone call;

(c) receiving signaling data and audio signals for the telephone call from the CTIA, wherein the signaling data and audio signals conform to the data communication protocol; and (d) communicating a switch instruction to the CTIA, causing the CTIA to connect a shared communication path among the telephone, the telephone network, and the computing device at the same time to enable:

conferencing a call over the telephone network with a call over the data network on either the telephone or the computing device, and sharing data from the telephone network and the data network on either the telephone or the computing device.

* * * * *